United States Patent
Peters et al.

(10) Patent No.: US 11,240,623 B2
(45) Date of Patent: Feb. 1, 2022

(54) RENDERING AUDIO DATA FROM INDEPENDENTLY CONTROLLED AUDIO ZONES

(71) Applicant: QUALCOMM Incorporated, San Diego, CA (US)

(72) Inventors: Nils Gunther Peters, San Diego, CA (US); S M Akramus Salehin, San Diego, CA (US); Shankar Thagadur Shivappa, San Diego, CA (US); Moo Young Kim, San Diego, CA (US); Dipanjan Sen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/058,760

(22) Filed: Aug. 8, 2018

(65) Prior Publication Data
US 2020/0053505 A1 Feb. 13, 2020

(51) Int. Cl.
*H04S 7/00* (2006.01)
*G02B 27/01* (2006.01)
*H04R 5/04* (2006.01)

(52) U.S. Cl.
CPC ............ *H04S 7/304* (2013.01); *G02B 27/017* (2013.01); *H04R 5/04* (2013.01); *H04S 7/306* (2013.01)

(58) Field of Classification Search
CPC combination set(s) only.
See application file for complete search history.

(56) References Cited

U.S. PATENT DOCUMENTS

| | | | |
|---|---|---|---|
| 5,027,689 A | 7/1991 | Fujimori | |
| 5,812,688 A | 9/1998 | Gibson | |
| 6,011,851 A | 1/2000 | Connor et al. | |
| 2009/0040997 A1* | 2/2009 | Oh | H04N 21/4347 370/345 |
| 2009/0122995 A1* | 5/2009 | Kim | G10L 21/028 381/17 |
| 2012/0182429 A1 | 7/2012 | Forutanpour et al. | |
| 2013/0263016 A1* | 10/2013 | Lehtiniemi | G06F 3/04815 715/753 |
| 2014/0016786 A1* | 1/2014 | Sen | G10L 19/008 381/23 |
| 2014/0115468 A1 | 4/2014 | Guerrero | |
| 2015/0340044 A1* | 11/2015 | Kim | G10L 19/008 381/23 |

(Continued)

*Primary Examiner* — Duc Nguyen
*Assistant Examiner* — Assad Mohammed
(74) *Attorney, Agent, or Firm* — Espartaco Diaz Hidalgo

(57) ABSTRACT

One or more processors may obtain a first distance between a first audio zone of the two or more audio zones associated with the one or more interest points within the first audio zone, and a first device position of a device, obtain a second distance between a second audio zone of the two or more audio zones associated with the one or more interest points within the second audio zone, and the first device position of the device, and obtain an updated first distance and updated second distance after movement of the device has changed from the first device position to a second device position. The one or more processor(s) may independently control the first audio zone and the second audio zone, such that the audio data within the first audio zone and the second audio zone are adjusted based on the updated first distance and updated second distance.

29 Claims, 10 Drawing Sheets

(56) References Cited

U.S. PATENT DOCUMENTS

| | | |
|---|---|---|
| 2015/0373477 A1 | 12/2015 | Norris et al. |
| 2016/0004405 A1 | 1/2016 | Kim et al. |
| 2016/0266386 A1 | 9/2016 | Scott et al. |
| 2016/0299738 A1 | 10/2016 | Mkinen et al. |
| 2017/0098453 A1 | 4/2017 | Wright et al. |
| 2017/0163907 A1* | 6/2017 | Connolly ............... G06Q 30/00 |
| 2017/0188170 A1* | 6/2017 | Prins ...................... H04S 7/302 |
| 2017/0192232 A1* | 7/2017 | Katz ..................... G06T 19/006 |
| 2017/0195815 A1* | 7/2017 | Christoph ................ H04R 5/02 |
| 2017/0359467 A1 | 12/2017 | Norris et al. |
| 2018/0098173 A1* | 4/2018 | van Brandenburg ... H04S 7/303 |
| 2018/0150275 A1* | 5/2018 | Mate ...................... H04S 7/304 |
| 2018/0190300 A1* | 7/2018 | Mate .................... H04N 21/233 |
| 2018/0210697 A1* | 7/2018 | Rakshit ................ G11B 27/102 |
| 2018/0288518 A1* | 10/2018 | Schmidt ............... H04R 1/1083 |
| 2018/0321906 A1* | 11/2018 | Laaksonen ............. G06F 3/017 |
| 2018/0352018 A1* | 12/2018 | Mate ...................... H04L 67/18 |
| 2020/0053464 A1 | 2/2020 | Peters |

\* cited by examiner

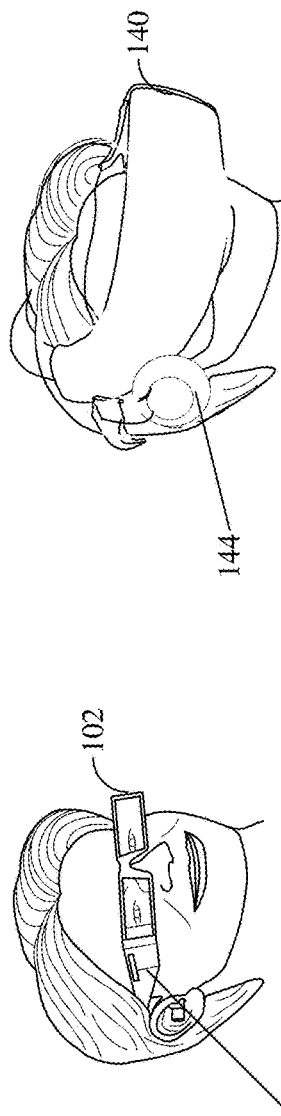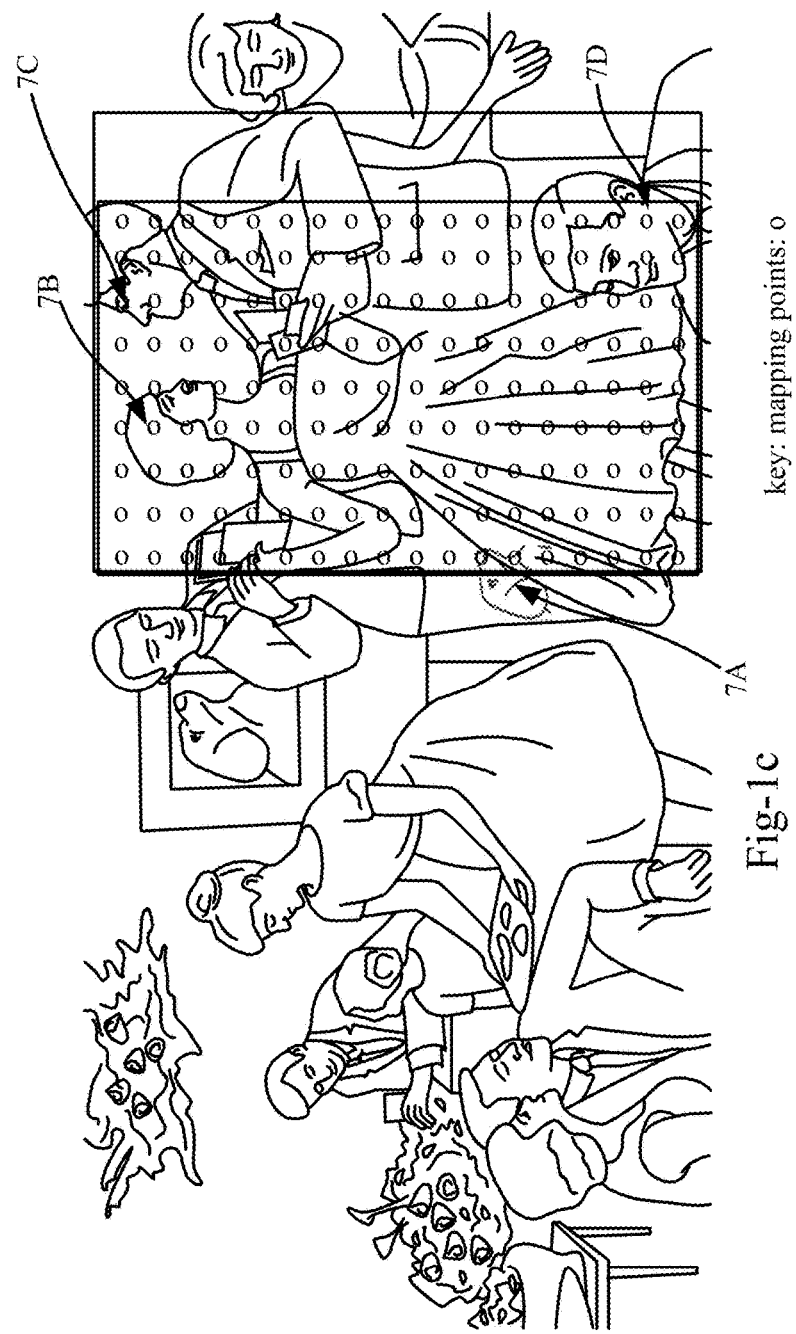

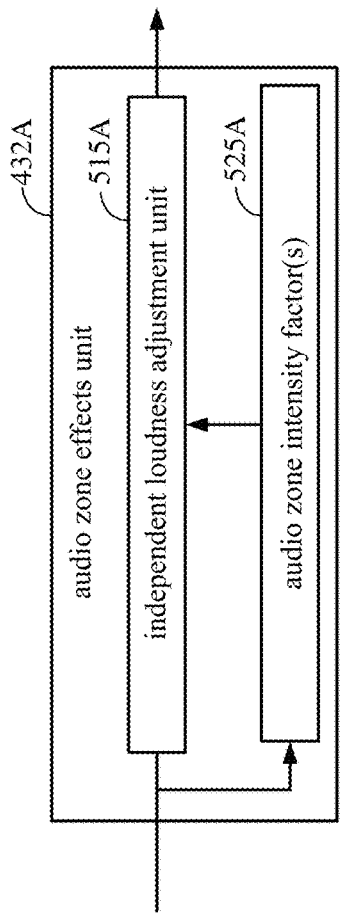
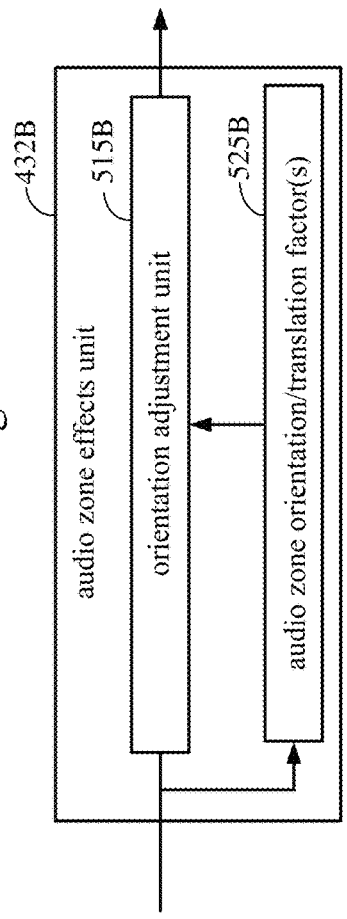
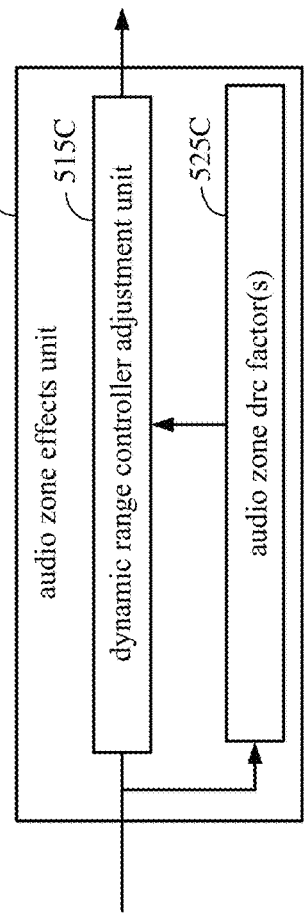

RENDERING AUDIO DATA FROM INDEPENDENTLY CONTROLLED AUDIO ZONES

TECHNICAL FIELD

This disclosure relates to processing of media data, such as audio data.

BACKGROUND

In recent years, there is an increasing interest in Augmented Reality (AR), Virtual Reality (VR), and Mixed Reality (MR) technologies. Advances to image processing and computer vision technologies in the wireless space, have led to better rendering and computational resources allocated to improving the visual quality and immersive visual experience of these technologies.

In VR technologies, virtual information may be presented to a user using a head-mounted display such that the user may visually experience an artificial world on a screen in front of their eyes. In AR technologies, the real-world is augmented by visual objects that are super-imposed, or, overlaid on physical objects in the real-world. The augmentation may insert new visual objects or mask visual objects to the real-world environment. In MR technologies, the boundary between what's real or synthetic/virtual and visually experienced by a user is becoming difficult to discern.

SUMMARY

This disclosure relates generally to auditory aspects of the user experience of computer-mediated reality systems, including virtual reality (VR), mixed reality (MR), augmented reality (AR), computer vision, and graphics systems. The techniques may include a memory configured to store audio data within a first audio zone and a second audio zone, and one or more processors coupled to the memory, configured to obtain a first distance between the first audio zone and a first device position. The one or more processors may also be configured to obtain a second distance between the second audio zone and the first device position. In addition, the one or more processors may be configured to obtain an updated first distance and updated second distance after the device has moved from the first device position to a second device position. Moreover, the one or more processors may be configured to adjust audio data within the first audio zone based on the updated first distance, and adjust audio data within the second audio zone based on the updated second distance. The one or more processors may also be configured to include independent control of the first audio zone and the second audio zone, such that the audio data within the first audio zone and the second audio zone is adjusted based on the updated first distance and the updated second distance. In addition, the one or more processors may be configured to generate speaker feeds based on the adjusted audio data within the first audio zone and the adjusted audio data within the second audio zone.

In one example, the techniques are directed to obtaining a first distance between a first audio zone of the two or more audio zones associated with the one or more interest points within the first audio zone, and a first device position of a device. The techniques further include obtaining a second distance between a second audio zone of the two or more audio zones associated with the one or more interest points within the second audio zone, and the first device position of the device. In addition, the techniques include obtaining an updated first distance and updated second distance after movement of the device has changed from the first device position to a second device position. Moreover, the techniques include controlling, independently, the first audio zone and the second audio zone, such that the audio data within the first audio zone and the second audio zone is adjusted based on the updated first distance and the updated second distance. The techniques also include generating speaker feeds based on the using an audio zone control unit to independently control of the first audio zone and the second audio zone based on the adjustment.

In another example, the techniques are embodied in an apparatus. The apparatus may include means for obtaining a first distance between a first audio zone of the two or more audio zones associated with the one or more interest points within the first audio zone, and a first device position of a device. The apparatus may also include means for obtaining a second distance between a second audio zone of the two or more audio zones associated with the one or more interest points within the second audio zone, and the first device position of the device. In addition, the apparatus may include means for obtaining an updated first distance and updated second distance after movement of the device has changed from the first device position to a second device position. Moreover, the apparatus may include means for controlling, independently, the first audio zone and the second audio zone, such that the audio data within the first audio zone and the second audio zone is adjusted based on the updated first distance and the updated second distance. The apparatus may also include means for generating speaker feeds based on the using an audio zone control unit to independently control of the first audio zone and the second audio zone based on the adjustment.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIG. 1a illustrates a representation of display device that may be an AR, MR, or VR device.

FIG. 1b illustrates a representation of display device that may be an AR, MR, or VR device.

FIG. 1c illustrates a representation of a scene associated with one or more audio zones that may be used when performing various aspects of the techniques in this disclosure.

FIG. 5a is a block diagram illustrating example inputs and outputs of a zone control unit which may be used to perform the various aspects of this disclosure.

FIG. 5b is another block diagram illustrating example inputs and outputs of the zone control unit which may be used to perform the various aspects of this disclosure.

FIG. 5c is a block diagram illustrating more granularity around the inputs and outputs of the zone control unit which may be used to perform the various aspects of this disclosure.

DETAILED DESCRIPTION

Figure 2A:
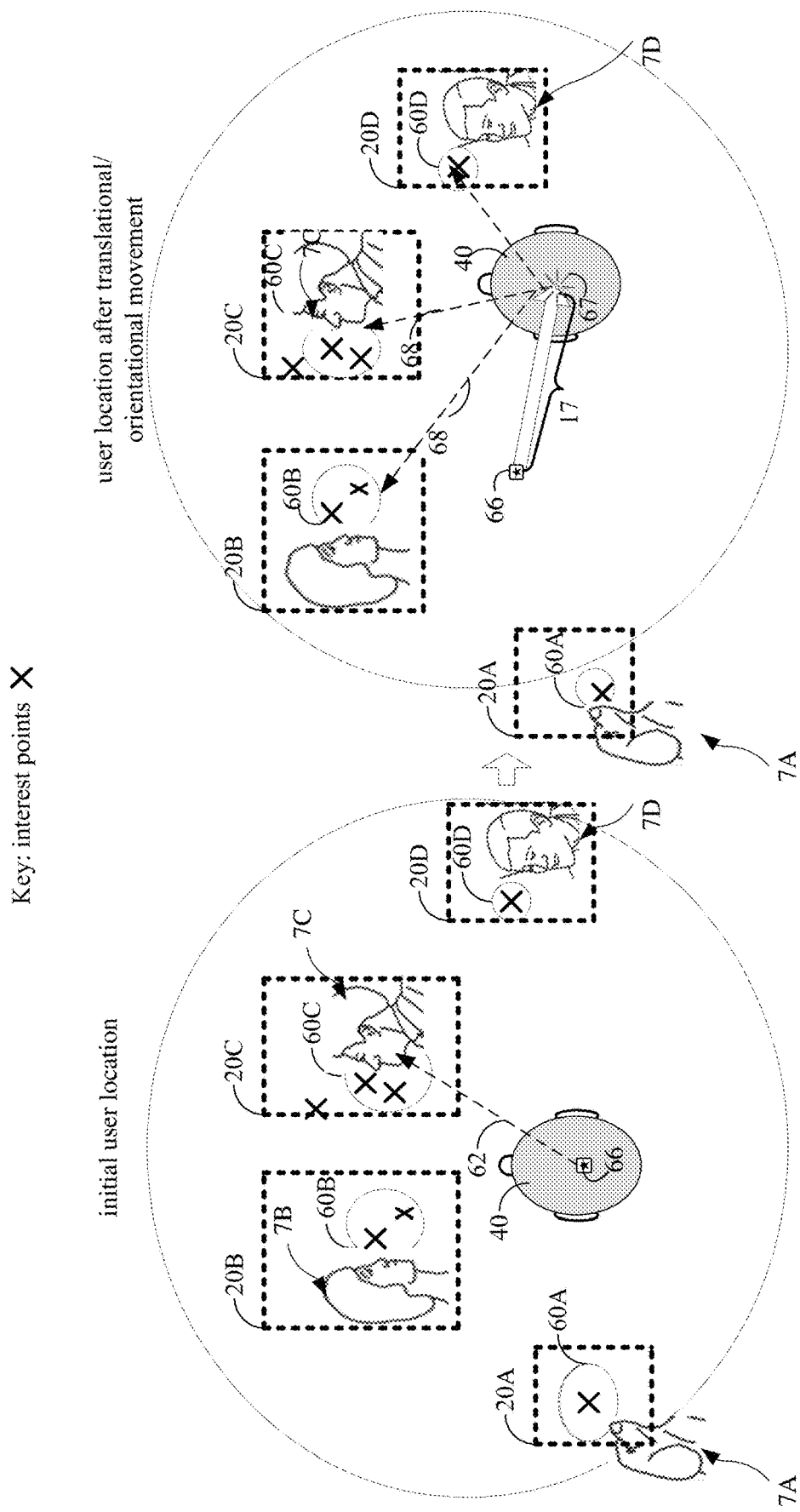
FIG. 2a illustrates a representation of two views. The first view, on the left part of the figure, is a representation of one or more audio zones relative to an initial user location. The second view, on the right part of the figure, is a representation of the one or more audio zones relative to the user location after a translational and/or orientational movement of the user.

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a,", "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example may be that any of the transceivers or antennas described herein that may be "coupled" to a processor, but not necessarily part of the package that includes an AR, VR or MR device. Other examples may be inferred from the context disclosed herein, including this paragraph, when using the term "integrated".

As used herein "a wireless" connection between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long-Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

As used herein A "and/or" B may mean that either "A and B", or "A or B", or both "A and B" and "A or B" are applicable or acceptable.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information As used herein, independently control may include manipulation, adjustment or rotation of audio data within one audio zone that is independent of a second audio zone. For example, in one audio zone audio data may be compensated (an example of an adjustment) for loudness while in another audio zone audio data may be dynamically range compressed. In another example, the audio zone, the audio data in one audio zone maybe rotated, while audio zone in a different audio zone is equalized. Typically, audio data exists within an entire soundfield and is manipulated or adjusted all at once, without the ability to segment a three-dimensional soundfield into different audio zones as described herein. If audio data that is part of a soundfield is manipulated or adjusted, it is not done in two audio zones with the ability to control two different types of operations (e.g., loudness compensation, equalization, rotation, dynamic range compression, etc.) in parallel and independently.

As used herein, "mapping points" may include sampling points or samples of a soundfield of an audible scene. Audible scenes are three-dimensional and the sampling points may be uniformly spaced or non-uniformly spaced within the three-dimensional soundfield. Mapping points may be visualized, for example, as part of a user interface, but do not necessarily have to be visualized. AR, VR and/or MR devices may include displays that project a visual scene. Where audible scenes and visual scenes co-exist to represent a three-dimensional space, mapping points may represent pixels of a video object, as sound in a soundfield may be associated with or near the video object. There may be different types of audio formats, where the audio format is a scene-based audio format, the mapping points may be anchor points, but do not necessarily have to be anchor points. Mapping points (o) may also be interest points (x). An audio object or source, or an ambient sound source may comprise a number of mapping points. The mapping points may be clustered together through an association to an audio object or source, or ambient source to form one or more interest points to represent the audio object or source, or ambient sound source. In one example, the audio source or object may be an "impulse", in such a case the mapping point and the interest point are one in the same.

An interest point, as used herein, may be a cluster of a number of mapping points. In some examples, the location of the sound source or ambient sound, may be an audio interest point. In other examples, a video object or cluster of pixels may be used to generate a visual interest point. The visual interest point and audio interest point may be included in the cluster of mapping points.

As used herein, a unit can include, for example, a special purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

An audio zone is a collection of interest points. The audio zone's dimensions are based on including one or more audio sound sources within a spatial region of the soundfield. When a visual object that makes a sound is included, the audio zone may include the visual object from where the sound is emanating and enclose audio data that includes an audio source or audio source(s) and/or an ambient sound source.

The terms "AR device", "MR device" and/or "VR device" may be integrated with any electronic device that includes circuitry for wirelessly sending and/or receiving information, including any one or all of cellular telephones, personal or mobile multimedia players, watches, wrist displays, medical devices, headsets, headphones, and/or standalone AR/MR/VR devices, speakers, microphones, computing devices, and other similar electronics.

Though full three-dimensional audible rendering still poses challenges, the techniques in this disclosure enable a further step towards that end. Audio aspects of AR, MR, and/or VR may be classified into three separate categories of immersion. The first category provides the lowest level of immersion and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational (and orientational) head movements in which the head is not centered on the optical and acoustical center of the soundfield.

The second category, referred to 3DOF plus (3DOF+), provides for the three degrees of freedom (yaw, pitch, and roll) in addition to limited spatial translational (and orientational) movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of a person in space (x, y, and z translations). The spatial translations may be induced by sensors tracking the location of the person in the physical world or by way of an input controller.

Audio aspects of VR may be less immersive than the video aspects, thereby potentially reducing the overall immersion experienced by the user. However, with the advances in processors and wireless connectivity it may be possible to achieve 6DOF rendering with wearable AR, MR and/or VR devices. Moreover, in the future it may be possible to take into account movement of a vehicle that has the capabilities of AR, MR and/or VR devices and provide an immersive audio experience. In addition, a person of ordinary skill would recognize that a mobile device, e.g. a handset may also implement VR, AR, and/or MR techniques.

In accordance with the techniques described in this disclosure, various ways by which to adjust audio data (whether in an audio channel format, an audio object format, and/or an audio scene-based format) may allow for 6DOF audio rendering. 6DOF rendering provides a more immersive listening experience by rendering audio data in a manner that accounts for both the three degrees of freedom in term of head movements (yaw, pitch, and roll) and translational movements (in a spatial three-dimensional coordinate system—x, y, z). In implementation, where the head movements may not be centered on the optical and acoustical center adjustments may be made to provide for 6DOF rendering, and not necessarily be limited to spatial two-dimensional coordinate systems. As disclosed herein, the following figures and descriptions allow for 6DOF audio rendering.

FIG. 1a illustrates a representation of display device 102 that may be an AR, MR, and/or VR device. A person may wear the device 102. The device 102 may be an AR, MR and/or VR device. The device 102 may include one or more sensors may include an orientation/translation unit, a visual unit, and/or an audio capture device. Though the device 102 is drawn as a wearable device, there may be other form factors for the device 102. For example, the device 102 may be included in a vehicle (not expressly drawn), or a robot (not expressly drawn), or other electronic devices (not expressly drawn) that have capabilities of AR MR or VR. The device 102 may be coupled to speakers associated with the device 102. The speakers may also be integrated with the device 102 or may be external to the device 102.

An AR, VR and/or MR device 102 may also include other types of wearable devices besides those shown. For example, watches (such as so-called "smart watches"), glasses (such as so-called "smart glasses"), headphones (including wireless headphones coupled via a wireless connection, or smart headphones coupled via wired or wireless connection), and any other type of wearable device may be an AR, VR, and/or MR device 102. As such, various techniques disclosed herein may be performed by a number of wearable devices by which a user may interact with the wearable device while worn by the user.

FIG. 1b representation of display device that may be an AR, MR, and/or VR device. A person may wear a device 140. The device 140 may be an AR, MR or VR device. The device 140 may include an orientation/translation unit, a visual sensor, and/or an audio capture device. The orientation/translation unit may provide one or more measurements representative of the movement of the device 140. Though the device 140 is drawn as a wearable device, there may be other form factors for the device 140. For example, the device 140 may be included in a vehicle (not expressly drawn), or a robot (not expressly drawn), or other electronic devices (not expressly drawn) that have capabilities of AR, MR, and/or VR.

Similar to the device 102 illustrated in FIG. 1a, an AR, VR and/or MR device 140 may also include other types of wearable devices besides those shown. For example, watches (such as so-called "smart watches"), glasses (such as so-called "smart glasses"), headphones (including wireless headphones coupled via a wireless connection, or smart headphones coupled via wired or wireless connection), and any other type of wearable device may be an AR, VR, and/or MR device 140.

A device that covers a person's eyes without letting in light from the outside may appear as in FIG. 1b and may be associated with a VR device. However, AR, MR, and/or VR devices may have different form factors. For example, an AR, MR and/or VR device may have a display screen that allows for external video objects or a video scene to be viewed, or alternatively, multiple display screens (e.g., translucent screens or projective screens) may be included in a device to perform either AR, MR, and/or VR. Thus, a form factor such as FIG. 1a or FIG. 1b may be used for AR, MR and/or VR devices. The device 140 in FIG. 1b is also coupled to speakers 144.

FIG. 1c illustrates a representation of a scene associated with one or more audio zones that may be used when performing various aspects of the techniques in this disclosure. In FIG. 1c, the representation may appear two-dimensional or three-dimensional. The representation may include visual objects, audible objects and/or visual objects and audible objects. A portion of a display screen 90 on a display device 100 (see FIG. 4) may be used to represent visual objects in the scene. For example, in FIG. 1c, there is part of a dog 7A in the lower left of the display screen 90, a woman 7B near the top of the display screen 90, and a man 7C speaking with the woman 7B near the top of the display screen 90, and another man 7C in the lower part of the display screen 90. Superimposed in the screen 90 are mapping points (o) associated with an AR, MR and/or VR device. The mapping points may be uniformly spaced or non-uniformly spaced. The mapping points may or may not be visualized. Neither the mapping points nor the interest points in this disclosure have to necessarily be anchor points. An audio zone and tracking of an audio zone may allow for more independent flexibility to process and control audio data. The audio data operated on is not limited to an ambisonics domain (as used in scene-based audio formats, but with other formats, e.g. channel and/or object format). Moreover, video objects may be associated with audio zones, which in some embodiments allows for leveraging of face detection techniques which are already readily used in different mobile devices.

FIG. 2a illustrates a representation of two views. The first view, on the left part of the figure, is a representation of one or more audio zones relative to an initial user location. The second view, on the right part of the figure, is a representation of the one or more audio zones relative to a user location after a translational and/or orientational movement. A person 40 may wear an AR, MR and/or VR device (102, 140). The AR, MR and/or VR device (102, 140) may be coupled to a display device 100. The display device 100 may be configured to represent an audio zone, where the audio zone may include audio data that is distributed spatially. For example, the audio zone denoted for illustration purposes as a square with dashed lines around the border of the audio zone. The audio zone may be associated with a visual object, an audio object, and/or both a visual object and the audio object. In an embodiment, the mapping points (o) illustrated in FIG. 1c may be mapped to interest points (x) (see FIG. 6). The mapping points may be pixels when the scene is made up of a visual scene and an audible scene. In an alternative embodiment, the mapping points may be sampling points, that sample a soundfield, when the scene is an audible scene.

Figure 4:
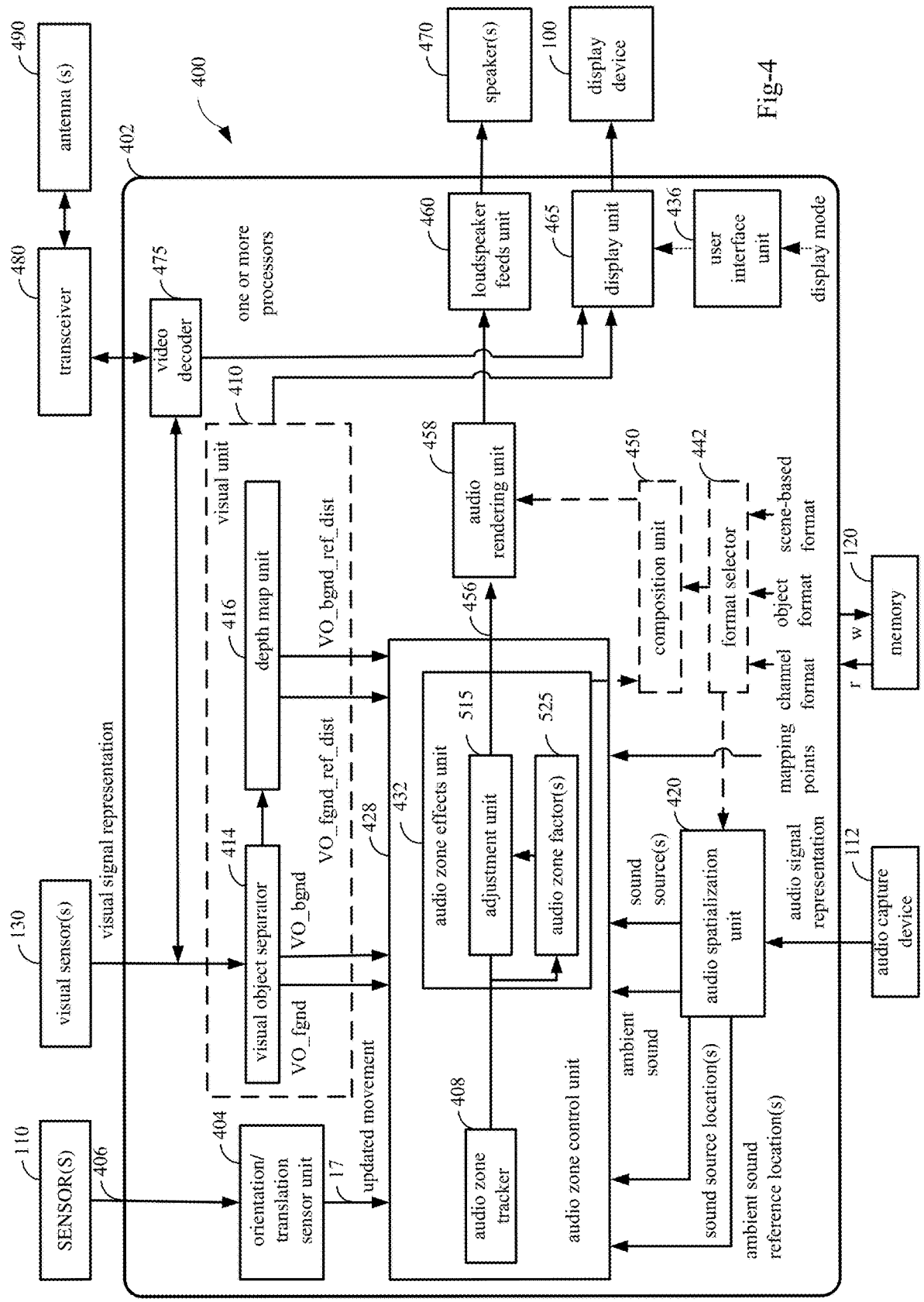
FIG. 4 is a block diagram illustrating blocks that may be used to implement techniques in accordance with the various aspects of this disclosure.

The AR, MR and/or VR device (102, 140) may include one or more processors that include units illustrated in FIG. 4. The device 400 may be coupled to a memory 120. The memory 120 may be configured to store audio data within two or more audio zones associated with one or more interest points, wherein one or more interest points are associated with each zone of the two or more audio zones. For example, as illustrated in FIG. 2a there are four audio zones (20A, 20B, 20C, 20D) shown in each of the left view (initial user location) and the right view (after translational/ orientational movement). The interest points are denoted by an "X". In one embodiment, the interest points may be the same as the sampling points. In another embodiment, the interest points may be the same as mapping points. In yet another embodiment, the interest points are located near where there is sound, or there could be sound. For example, in the audio zone 20A associated with the dog 7A, there is sound 60A within the audio zone 20A. That sound 60A may be represented by audio data within the audio zone 20A. The audio data may be associated with the one interest point within the audio zone 20A. Similarly, the sound 60B within the audio zone 20B associated with the woman 7B may be represented by audio data associated with two interest points. The sound 60C within the audio zone 20C associated with the man 7C speaking with the woman 7B may be represented by audio data associated with three interest points. In general, audio data may be represented by audio data associated with one or more interest points. The number of interest points may be a function of the loudness of the sound and the spatial distribution of the sound.

The AR, MR and/or VR device (102, 140) may be wearable (not expressly shown in FIG. 2a). There may be a reference point or points on the wearable to one or more of the audio zones. For example, the point between the eyes of a person may be considered a reference point, or if there is a headband or strip that goes over the head of the person, the mid-point of the strip or headband maybe considered a reference point. Other points located as part of the person or part of the wearable device may be considered a reference point. In FIG. 2a, the left view represents a reference point with a star 66. The right view represents the reference point with a different star 67. The one or more processors in the AR, MR and/or VR device may obtain a first distance 62 between an audio zone 20C and a reference point 66. The reference point 66 is relative to the initial location of the person 40. Thus, if a person is wearing the AR, MR and/or VR device, the device position may serve as the reference point. For example, the one or more processors may obtain the first distance 62 between the audio zone 20C and a first device position. After the person makes a translational movement, e.g., the person either moves forward, backward, down, up, or to a side, that person moves from the first device position to the second device position. After the person makes a rotational movement, i.e., the person orients his/her head clockwise, counter-clockwise, or up and down, the device (102, 140) moves from the first device position to the second device position. Such movement (whether translational or rotational), when the first device position moves to the second device position is designated as an updated movement 17. Thus, the one or more processors may obtain an updated first distance 62 after movement of the device (102, 140) has changed from the first device position to the second device position. When there is at least a second audio zone, there may be a distance (not expressly shown) between a first device position (or a reference point on the person at an initial user location). The one or more processors may obtain the distance (a second distance) between the first device position and the second audio zone. After movement of the device (102, 140) has changed from the first device position to the second device position, the one or more processors may obtain an update second distance between the second audio zone and the first device position.

The orientation/translation sensor unit 404 in the device (102, 140) may represent a combination of a microelectromechanical system (MEMS) for sensing, or any other type of sensor capable of providing information in support of head and/or body tracking. In one example, the orientation/translation sensor unit 404 may represent the MEMS for sensing translational movement similar to those used in cellular phones, such as so-call "smart phones." More information regarding MEMS for sensing used to perform head tracking can be found in a paper by LaValle, et. al., entitled "Head Tracking for the Oculus Rift," accessed on Aug. 17, 2017 at a URL at msl.cs.illinois.edu/~lavalle/papers/LavYerKatAnt14.pdf. In addition, more information regarding head and body tracking using a camera and various other sensors (for example the visual sensor(s) 130 (could also be used to track head and/or body movements) can be found in a paper by Jesper Tingvall, entitled "Interior Design and Navigation in Virtual Reality," dated Nov. 1, 2015.

The one or more processors may, using an audio zone control unit, independently control the first audio zone and the second audio zone associated with the one or more interest points, such that the audio data within the first audio zone and the second audio zone is adjusted based on the updated first distance and the updated second distance. In addition, the one or more processors may generate speaker feeds based on the using the audio zone control unit to independently control the first audio zone and the second audio zone.

In an alternative embodiment, the person 40 may be in a vehicle where the display device 100 is integrated into the vehicle. The person's 40 head movement and/or eye gaze may be tracked with internal cameras mounted within the cabin of the vehicle to determine the head movement or eye gaze. As part of the electronics coupled or integrated with the vehicle there may be one or more processors that may obtain a first distance from the person's head movement and/or eye gaze at a first position to an audio zone, and then after the head movement and/or eye gaze to a second position obtain the updated first distance. In a similar fashion, a second distance to a second audio zone may be obtained from a person's head movement and/or eye gaze at a first position, and after the head movement and/or eye gaze to a second position, the one or more processors within the vehicle may obtain an updated second position. Instead of the device's (102, 140) initial and final position on a wearable device, the first and final position are based on the person's initial and final head movement and/or eye gaze within the vehicle.

As such, the AR, MR, and/or VR device (102, 140) may be coupled or integrated into the vehicle. Note, the nomenclature (102,140) for convenience is used to refer to both the devices illustrated in FIG. 1a and FIG. 1b. The device (102, 140), may further include one or more sensors configured to estimate a distance representative of the movement of the device. The estimated distance may be the first distance to the first audio zone, or the second distance to the second audio zone, or some other distance that enables the one or more processors to determine the first distance to the first audio zone, or the second distance to the second audio zone, and takes into account the movement of the device from the first device position to the second device position. The one or more sensors may be included, alternatively, in the vehicle and aid in determining the head movement of the person or the eye gaze. In an alternative embodiment, the vehicle may be considered to move from one device position to a second device position, where the device position is a vehicle position.

Moreover, the device (102, 140), or the vehicle, may include a transmitter configured to send the first device position, the second device position, and the difference between the first device position and the second device position, or the first device position, or the second device position, or the difference between the first device position and the second device position.

In an embodiment, the device (102, 140), or the vehicle, may include a camera configured to capture one or more images, and regions of interest associated with the first audio zone and the second audio zone. If the cameras are included in a vehicle, they may be in-cabin cameras to capture the different audio zones within the vehicle. In an alternate embodiment, the cameras may be external to the vehicle, and may be out-of-the-cabin cameras to capture different audio zones external to the vehicle.

The AR, VR and/or MR device (102, 140) or the vehicle may also include one or more speakers configured to receive the speaker feeds based on the control of the first audio zone and the second audio zone, render the speakers feeds and play out the audio data within the first audio zone or the second audio zone, or play out the audio data within the first audio zone and the second audio zone.

The one or more processors in the AR, VR and/or MR device (102, 140), or the vehicle may be configured to adjust audio data within the first audio zone by a first audio zone factor based on the movement of the device change from the first position to the second position, and may be configured to adjust audio data within the second audio zone by a second audio zone factor based on the movement of the device change from the first position to the second position.

Loudness compensation is one application of being able to control the first audio zone and the second audio zone associated with the one or more interest points, such that the audio data within the first audio zone and the second audio zone is adjusted based on the updated first distance and the updated second distance.

There may be a first loudness compensation based on the movement of the device (102, 140) or vehicle change from the first position to the second position, and the audio data within the second zone is adjusted comprising a second loudness compensation based on the movement of the device (102, 140) or vehicle change from the first position to the second position.

Figure 2B:
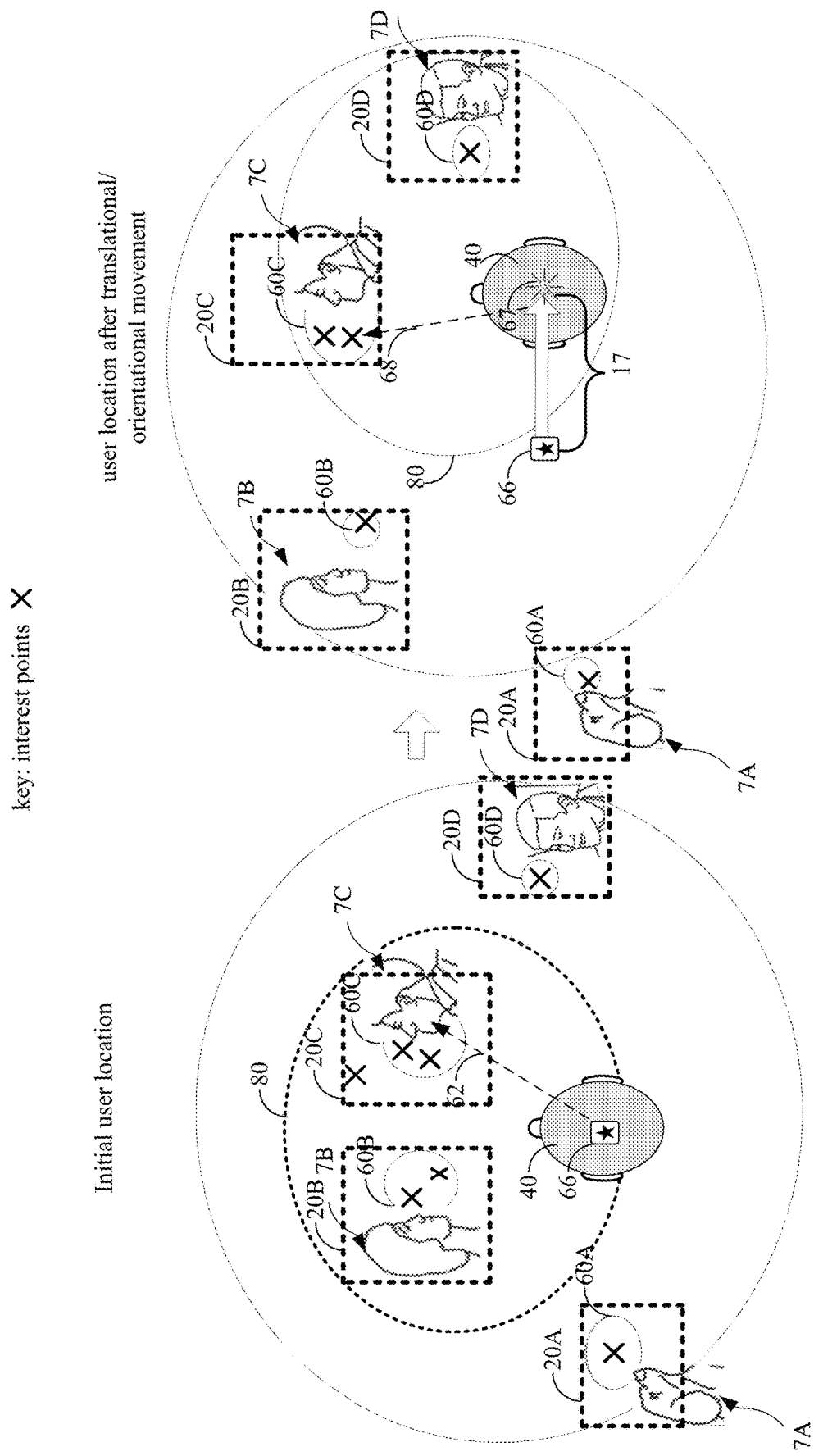
FIG. 2b illustrates a representation of two views. The first view, on the left part of the figure, is a representation of one or more audio zones in a layered soundfield relative to an initial user location. The second view, on the right part of the figure, is a representation of the one or more audio zones in the layered soundfield relative to the user location after a translational and/or orientational movement of the user.

FIG. 2*b* illustrates a representation of two views. The first view, on the left part of the figure, is a representation of one or more audio zones in a layered soundfield relative to an initial user location. The second view, on the right part of the figure, is a representation of the one or more audio zones in the layered soundfield relative to the user location after a translational and/or orientational movement. In both the first view and the second view, the first audio zone and the second audio zone are located in a layered soundfield. A layered soundfield may signify that there is a higher resolution of audio data between layers. A layered soundfield may also signify a relative radial distance between the person or the user of a device and different audio zones. As an example, there are two soundfields drawn in FIG. 2*b* though there may be more drawn in an alternative embodiment (different concentric rings representing different layers of a soundfield).

In FIG. 2*b*, a first layer or soundfield may be within the concentric circle 80 with dashed lines and may be referred to as a foreground soundfield. In FIG. 2*b*, the left view includes two audio zones (20B, 20C) within the foreground soundfield, and two audio zones (20A, 20D) that are outside the foreground soundfield. The soundfield outside the foreground soundfield may be designated as a background soundfield. Sound falls off (sounds softer) inversely, for a given amplitude and sound pressure, as a function of distance. Thus, the further the sound is away from the person, the softer it sounds, and it may sound like it is in the background of a scene. It should be noted, however, that there are also different types of sounds. For example, there may be a predominant sound or a diffuse sound. The predominant sound may be directional in nature, i.e., it appears to come from a certain direction. For example, a dog barking or a person speaking are examples of predominant sounds. There may be the sound of a fan, or wind, or a chair sliding across the floor. These sounds when heard by a person 40 may not appear to come from any particular direction, and thus may not be considered predominant sounds. As described herein, the layered soundfield represented in FIG. 2*b* may include predominant sounds in either the foreground soundfield or the background soundfield. Similarly, there may be diffuse sounds in either the foreground soundfield or the background soundfield. The background soundfield may also include ambient sounds. An ambient sound may be a diffuse sound. In some embodiments, the ambient sound may also be people speaking, however, because of the distance and other sounds in the environment it may not be possible to make out what they are saying, or if there are too many people speaking there is "babble noise", i.e., a lot of chatter of people.

As illustrated in FIG. 2*b*, when the device (102, 140) moves from a first device position to a second device position, an updated movement 17 is obtained by the one or more processors. Thus, the one or more processors may obtain an updated first distance 68 between the first audio zone 20C and the person 40, after movement of the device (102, 140) has changed from the first device position to the second device position. For a background soundfield, there may be a desired "ambient reference distance" that may be used for all of the audio objects or audio zones within the background soundfield. Though it is possible to obtain the distance of each of the audio zones, if they contain predominant sounds, like the sound of the dog 7A barking, or the man 7D speaking, it may be more computationally efficient to treat the distances of each of the audio zones or audio objects as having one ambient reference distance. Perceptually, it may be more desirable to have an ambient reference distance. Thus, though the distance between audio zone 20A including the dog 7A and the distance of the audio zone 20D including the man 7D may be different, in an embodiment these distances may be assigned the value of the same ambient reference distance. It is possible, though, however, that there are different ambient reference distances, one for each audio zone in the background soundfield.

In other examples, the reference distance is static, or defined as a syntax element of an audio bitstream. When defined using the syntax element, a reference distance may be static (such as sent a single time and therefore static for the duration of the experience) or dynamic (such as sent multiple times during the experience, e.g., per audio frame or per some periodic or non-periodic number of audio frames.

In the same or alternative embodiment, the audio zone 20A with the dog 7A and/or the audio zone 20D with the man 7D, these audio zones (e.g., either audio zone 20A or audio zone 20D may be a second audio zone in a layered soundfield, where the layered soundfield is a background soundfield) may be controlled.

One example of control may be loudness compensation for one or more audio zones. Another example of control may be adjusting orientation for one or more audio zones. Yet another example of control may be dynamic range control for one or more audio zones.

Control of an audio zone may be based on adjusting the loudness compensation, orientation, or dynamic range control of one or more audio zones based on an ambient reference distance. Moreover, the audio data within a first audio zone (e.g. audio zone 20A) may be configured to be adjusted based on the first loudness compensation based on a first ambient reference distance, and the audio data within the second audio zone (e.g. audio zone 20D) may be configured to be adjusted based on the second loudness compensation based on a second ambient reference distance. The ambient reference distances may be the same or different.

In an embodiment, the first audio zone (e.g., the audio zones 20B with the woman 7B and the audio zone 20C with the man 7C speaking with her) is in a layered soundfield, and the layered soundfield is a foreground soundfield. In an embodiment, the one or more processors within the device (102, 140) or the vehicle may perform loudness compensation based on the foreground soundfield, where each distance from an audio zone (20B, 20C) to a person 40 may be considered its own foreground reference distance. In an alternate embodiment, the foreground reference distance may be the same for each audio zone in the foreground soundfield.

In an embodiment, the device (102, 140) the first audio zone may be configured to transition from the first layer of the layered soundfield to the second layer of the layered soundfield. A transition from one layered soundfield to another layered soundfield of an audio zone, may be, for example, the audio zone 20D transitioning from the background soundfield to the foreground soundfield 80, as shown in the right view of FIG. 2b. The sound from the man 7D may change from an ambient sound (possibly not as discernable when the sound is in the background soundfield) to a predominant sound (the sound, e.g., the speech, is more pronounced in the foreground soundfield). Another example is the transition of the audio zone 20B with the woman 7B that was in the foreground soundfield 80, but after the updated movement 17 is in the background soundfield.

In an embodiment, a second audio zone (e.g. audio zone 20D) may transition from the second layer (e.g. the background soundfield) of the layered soundfield to the first layer (the foreground soundfield) of the layered soundfield, and the audio data within the first audio zone (e.g. audio zone 20B) may be adjusted based on the first loudness compensation based on the foreground distance, and the audio data within the second audio zone is configured to be adjusted comprising the second loudness compensation based on a second foreground distance. That is to say, even though the second audio zone was in a background soundfield, after the updated movement 17, the second audio zone has transitioned to the foreground soundfield. Both the audio zones (the first and the second audio zones) may be updated based on a foreground distance. The foreground distances are different. However, there may be instances where it is desireable to use only one of the foreground distances for all audio zones in the foreground soundfield 80.

Figure 3:
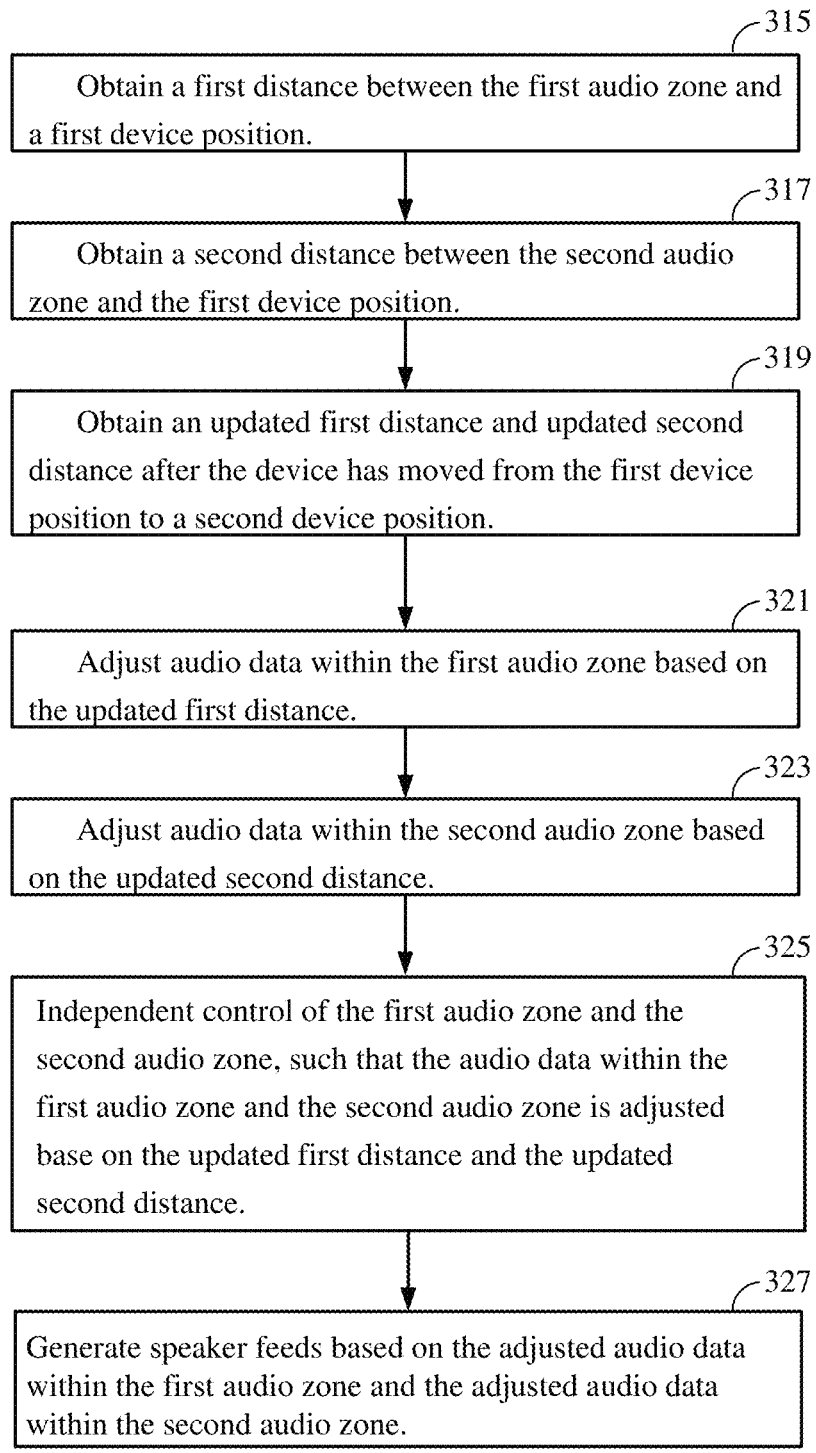
FIG. 3 is a flowchart illustrating an example process that may be performed in accordance with various aspects of this disclosure.

FIG. 3 is a flowchart illustrating an example process that may be performed in accordance with various aspects of this disclosure. A device (102, 140) or a vehicle (where the vehicle may be considered an AR, MR, and/or VR device that may be at different device positions, i.e., a first device position and move to a second device position) may include one or more processors that may obtain a first distance between the first audio zone and a first device position 315. The one or more processors may obtain a second distance between the second audio zone and a second device position 317. The one or more processors may obtain an updated first distance and updated second distance after the device has moved from the first device position to a second device position 319. Moreover, the one or more processors may be configured to adjust audio data within the first audio zone based on the updated first distance 321, and adjust audio data within the second audio zone based on the updated second distance 323. The one or more processors may also be configured to include independent control of the first audio zone and the second audio zone, such that the audio data within the first audio zone and the second audio zone is adjusted based on the updated first distance and the updated second distance 325. In addition, the one or more processors may be configured to generate speaker feeds based on the adjusted audio data within the first audio zone and the adjusted audio data within the second audio zone 327.

FIG. 4 is a block diagram illustrating blocks that may be used to implement techniques in accordance with the various aspects of this disclosure. In FIG. 4, an AR, MR, and/or VR device (102, 140) or an AR, MR, and/or VR device integrated into a vehicle may be include components in a device 400 as shown in FIG. 4. The device 400 may include one or more processors 402 that may also include a zone control unit 428 integrated into the one or more processors, wherein the zone control unit 428 is configured to receive an updated movement 17. The updated movement 17 may be used to determine the updated first distance or the updated second distance, or both the updated first distance and the updated second distance. The zone tracker 408 in the zone control unit 428 may operate in different audio domains.

In the same or alternative embodiment, the zone control unit 428 includes a zone tracker 408 that is configured to track the two or more audio zones and is configured to receive the updated movement 17, compare the updated movement 17 with a sound location of associated audio interest point, and adjust a translation or orientation, or both the translation and the orientation of a soundfield within each audio zone of the two or more audio zones. It should be noted that in alternate implementations the audio zone tracker functionality may be located in other blocks within the zone control unit, but may be called another name, or may be absorbed into the functionality of the zone control unit itself. For example, in some implementations, the audio zone tracker "tracks'" the audio zones but may not necessarily compare the updated movement 17 with a sound location of associated audio interest point, and adjusts a translation or orientation, or adjusts both the translation and the orientation of a soundfield within each audio zone of the two or more audio zones.

In the same or alternative embodiment, an audio spatialization unit 420 integrated with the one or more processors 402, may be configured to output 424 one or more sound sources and corresponding locations of the one or more sound sources. For example, the bark of the dog 7A, or the speech of the woman 7B, or speech of the men 7C, 7D may be considered as sound sources. The spatial locations of where the sound associated with them 7A, 7B, 7C, 7D may be output by the audio spatialization unit 420. The spatial locations may be sound source locations(s) and/or ambient/diffuse location(s). In the same or alternative embodiment, the spatial locations may be assigned to the audio zones, depending on the size of the audio zone, and the particular implementation used to track the audio zones. In an embodiment, the spatial locations may be represented in cartesian coordinates (x, y, z). In an alternative embodiment, the spatial locations may be represented in spherical coordinates (r, theta, phi), or (r, azimuth angle, elevation angle). In other embodiments, the spatial locations may be represented with other coordinate representations.

In the same or an alternative embodiment, the audio spatialization unit 420 is further configured to output an ambient sound and a corresponding ambient sound reference distance. The ambient sound may be from a diffuse sound source. The ambient reference distance for different audio zones may be the same or different. It should be noted that the term ambient reference distance, ambient reference, and ambient reference location may be used interchangeably throughout this disclosure. Though distance and location may be different, in some implementations, the location and the distance may have the same origin reference point, and thus may have the same meaning.

In the same or alternative embodiment, the audio spatialization unit 420 is coupled to the audio capture device 112. The audio capture device may include one or more microphones configured to capture an audio signal and output an audio signal representation of the audio signal. The audio capture device 112 may include a linear array of microphones, an array of microphones in a different geometric shape (e.g. a tetrahedron, a cross, an "L" shaped). The array of microphones may be placed on different planes of the AR, MR and/or AR device (102,140). For example, on set of microphones may be on one side of a device, and another set may be another side of the device (e.g., a side may be the top, bottom, left, or right, depending on the form factor of the device). The number of microphones on each side do not necessarily have to be the same. The audio capture device 112 may also include a circular array of microphones in one or more planes (i.e., there may be a concentric circle of microphones in one plane, and a different concentric circle of microphones in another plane). The number of microphones in the different planes do not necessarily have to the same. Moreover, the capture device 112 may include a spherical array of microphones, hemisphere array of microphones (i.e., half of a sphere), quadsphere (i.e., quarter of a sphere), or some other fractional component of a sphere of microphones.

The audio capture device 112 may output, in any embodiment described within this disclosure, an audio signal representation of an audio signal. Depending on the embodiment, the audio signal representation may be an audio waveform. The audio waveform may be compressed, filtered, or coded in some embodiments. Depending on the embodiment, the audio signal representation may represent an audio signal in a time domain, a temporal frequency domain, or an ambisonics domain.

In a different embodiment, the audio spatialization unit 420 may be integrated into a decoder unit, that is also integrated into the one or more processors, wherein the decoder unit includes a parser unit that is configured to obtain an audio signal representation of an audio signal. The audio signal representation may be input into the audio spatialization unit 420. When the audio spatialization unit is integrated into a decoder unit, the audio signal representation of the audio signal may be part of a bitstream that is about to be decoded, or in some implementations the audio signal representation of the audio signal represents a decoded audio signal.

In the same or alternative embodiment, the audio spatialization unit 420 may be coupled to a storage unit that includes a memory 120. The audio spatialization unit 420, may be configured to store an audio signal representation, wherein the audio signal representation is input into the audio spatialization unit 420. The audio signal representation of the audio signal may be a compressed audio signal, filtered audio signal, and may be stored in different file formats. One or more processors may be configured to retrieve the audio signal representation in any format that it's stored in the memory 120 by reading (r) the memory 120. To store the audio signal representation of the audio signal the one or more processors may write (w) the audio signal representation of the audio signal into the memory 120.

The audio spatialization unit 420 may operate in a channel format mode, an object format mode, and/or a scene-based format mode. In an embodiment, the audio spatialization unit 420 may not support more than one type of audio format. In a different embodiment, the audio spatialization unit 420 may support two or more audio formats. For example, the audio spatialization unit 420 may support an object format and a scene-based format, or the audio spatialization unit 420 may support a channel format and an object format, or the audio spatialization unit 420 may support a channel format and scene-based format. In another embodiment, all three audio formats may be supported and there may be (optionally) a format selector 442 that may be used to switch between the different formats, and aid in supporting the audio spatialization unit 420 in what mode in may operate in (e.g., channel format mode, an object format mode, and/or a scene-based format mode). A scene-based format may include different types of ambisonic formats (e.g. Higher Order Ambisonics, Mixed Order Ambisonics, B-format (also known as first order ambisonics), or some other variant.

In one embodiment, one or more visual sensors 130 may output a visual signal representation of a video signal. In an embodiment, the video signal representation may include a set of pixels. The one or more visual sensors may be a camera or included in a camera, and may be configured to capture one or more images, and regions of interest associated with the first audio zone and the second audio zone.

In a different embodiment, the one or more processors 402 may receive a visual signal representation through a wireless connection with another device. The transceiver 480, coupled with the one or more antenna(s) 490 may be used to establish the wireless connection. The visual signal representation may be compressed, filtered, or coded in some embodiments. Bandwidth coded visual signals may be wirelessly transmitted and received between devices by including a video bitstream between the devices. In such instances, the video bitstream may be referred to as a visual signal representation of a video signal. The video bitstream may be decoded through a video decoder 475. The video decoder 475 may be integrated with the one or more processors 402. After the video decoder 475 decodes the video bitstream, the decoded video signal may be referred to as a reconstructed video signal. Thus, the reconstructed video signal is also another visual signal representation of a video signal.

The visual signal representation may be input into the visual unit 410. In one embodiment, the visual unit 410 may include a visual object separator 414. In the same or alternative embodiment, the visual unit 410 may include a depth map unit 416. The depth map unit 416 may read in or accept a depth map received from another device, for example, delivered through the transceiver 48, i.e., a depth map may be included in part of the video bitstream. In a different embodiment the video decoder 475 may be able to generate and/or estimate a depth map on-the-fly from a reconstructed stereoscopic image. In an embodiment, a depth map may provide a gray scale representation of a 360-degree virtual reality scene, where black represents a very far distance, and white represents a near distance with the various shades of gray indicated intermediate distances between black and white. An AR, VR, and/or MR device (102, 140) may utilize a depth map to formulate a view for either the left eye or the right eye from the respective right eye view or left eye view specified in the video bitstream (or captured by the visual sensor(s). The video decoder 475 may alter the amount of lateral distance between the right eye view and the left eye view based on the depth map, scaling the lateral distance smaller based on the darker the shade of gray. As such, near objects denoted in white or light shades of gray in the depth map may have a larger lateral distance between the left and right eye views, while far objects denoted in black or darker shades of gray in the depth map may have a smaller lateral distance between the left and right eye view (thereby more closing resembling a far-off point).

While described as performed with respect to a gray-scale depth map, the techniques may be performed with respect to other types of information providing depth information, such as a color image, color or gray-scale stereo images, infrared camera images, etc. The techniques may, in other words, be performed with respect to any type of information providing depth information of a scene associated with the corresponding audio data.

The visual unit 410 coupled with the audio zone control unit 428 may utilize the depth information provided by a depth map to adapt or adjust the location of the interest points relative to the head of the person 40. That is, the visual unit 410 coupled with the audio zone control unit 428 may map the interest points to the depth map and utilize the depth information of the depth map at the mapped locations within the depth map to identify a more accurate reference distance(s) of ambient reference distances and/or sound source location(s). As disclosed herein the audio zone control unit 428 may utilize the output of the depth map to provide the video object foreground and/or video object background locations. In other embodiments, it may be possible that the depth map is input directly into the audio zone control unit 428 and the varying depths of the depth map are associated with the mapping points to determine the dimensions of an audio zone, and interest points within an audio zone.

The audio zone control unit 428 may utilize a depth map to estimate individual distances for each mapping point, pixels, anchor points, interest points, or audio zones. As such, the audio zone control unit 428 may determine the updated distance or updated movement relative to each of the individually determined distances of the mapping points, pixels, anchor points (when the audio data is scene-based), interest points, or audio zones.

In an embodiment where there are foreground and background soundfields, the mapping points within the foreground soundfield may be in close proximity (e.g. within 2 meters) and the mapping points within the background soundfield may be far away (e.g. beyond 2 meters but within around up to 50 meters).

In an alternative embodiment, the depth map may be loaded into the memory 120 of the AR, MR and/or VR device (102, 140), and used in conjunction with the visual object separator 414. In an alternative embodiment, the visual unit 410 does not include a visual object separator and is not able to provide at least one video foreground object (VO_fgnd) and/or one video background object (VO_bgnd), and may include the depth map unit 416, that may aid in separating out different video objects based on depth. Those video objects that are located at further depths may be referred to as video foreground objects (VO_fgnd), and those video objects that are at closer depth may be referred to as video background objects (VO_bgnd). Thus, there may be an alternative embodiment to what is drawn that would illustrate four vertical arrows pointing down from the depth map unit 416. The four arrows would represent (at least one): (i) a video foreground object (VO_fgnd); (ii) a video background object; (iii) a reference distance for the video foreground object (VO_fgnd_ref_dist); and (iv) a reference distance for the video background object (VO_bgnd_ref dist).

In the same or alternative embodiment, one or more interest points are associated with a video object and are associated with the audio data within the first audio zone as the video object. For example, the dog 7A, the woman 7B, and the men 7C, 7D in the different audio zones may be video objects in some implementations. In the same or alternative embodiment, the one or more interest points are visual keypoints associated with the video object. The video objects may be a foreground video object (VO_fgnd). For example, the woman 7B and the man 7C speaking with the woman 7B may be designated as foreground video objects in FIG. 2a. The dog 7A and the man 7D not speaking with the woman 7B may be considered background video objects (VO_bgnd's). A video object may not necessarily be classified as either a foreground video object, or a background video object, but just referred to as a video object.

In some embodiments, the visual unit 410 may not include a depth map unit 416. For example, using face detection algorithms it may be possible to track a video object (i.e., the face of a person or the dog) relative to a person 40. The visual unit 410 may include a visual tracker (not shown) to track the video object, and the video object along with the relative distance of the video object to the person 40 or some other reference point may be output of the visual unit 410. In such instances, the mapping points may be associated with a video object, and there may not necessarily be a distinction between associating mapping points to a foreground video object versus associating mapping points to a video object, as there would only be a video object in those instances. Similarly, there may not necessarily be a distinction between associating mapping points to a background video object versus associating mapping points to a video object, as there would only be a video object in those instances. Within this disclosure, a skilled artisan would recognize that even though a foreground video object (or a background video object) is used in an example, in some cases, where the visual unit 410 does not distinguish between foreground and background video objects, as in the example of a face detector, the explanation for some of the use cases are still applicable a video object that is output by a face detector. In some embodiments, the face detector may be included in the visual unit 410, or the face detector may outside of the visual unit 410.

In an embodiment, the output of the visual unit 410 and/or the output of the video decoder 475 may be coupled to a display unit 465. The display unit 465 may process the output of the video decoder 475 and/or visual unit 410. The visualization of the video object may be represented by a bounding box or some other marker and may be superimposed or augmented to a reconstructed video signal. Thus, the arrow from the visual unit 410 connecting to the display unit 465 may represent the marker or some other designation that there has been a video object detected by the visual unit 410. Similarly, the arrow from the video decoder 475 may represent that a reconstructed video signal may be processed by the display unit 465. The output of the display unit 465 may be sent to a display device 100 that a person 40 sees. Examples depicting, in part, what a person 40 may see on the display device 100 are shown in FIGS. 2a and 2b.

The display unit 465 may be coupled to the user interface unit 436. The user interface unit 436 may be used to implement the control logic associated with the techniques described herein.

In an embodiment one or more interest points are associated with a video object within the first audio zone and the one or more interest points are associated with the audio data within the first audio zone. In the same or alternative embodiment, the one or more interest points are visual keypoints associated with the video object. In the same or alternative embodiment, the video object is a foreground video object, or the video object is a background video object. In the same or alternative embodiment, the audio data within the first zone is associated with the foreground video object if the video object is the foreground video object. In the same or alternative embodiment, the audio data is also associated with a diffuse sound.

In an embodiment, the audio data within the first zone is associated with the background video object if the video object is the background video object, and the audio data is also associated with a predominant sound.

In an embodiment, the AR, VR, and/or MR (102, 140) device may also include one or more speakers configured to receive speaker feeds. The speaker feeds may be generated by the loudspeaker feeds unit 460. The loudspeaker feeds unit 460 may convert the output of the audio rendering unit 458 into speaker feeds which may drive the one or more speakers 470. The audio rendering unit 458 is configured to take the output 456 of the audio zone effects unit 432. The output 456 may be channel-based audio, object-based audio or ambisonics-based audio. The speaker feeds may be based on using an audio zone control unit of the first audio zone and the second audio zone. The one or more speakers 470 may be configured to render the speakers feeds and be configured to play out the audio data within the first audio zone or the second audio zone, or configured to play out the audio data within the first audio zone and the second audio zone. The one or more speakers 470 may be part of a speakers included in a vehicle. Alternatively, the one or more speakers 470 may be binaural speakers that are part of the AR, VR, and/or MR device 102, 140.

Binaural speakers may be headphones and coupled to the AR, VR and/or MR device via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones may recreate, based on the left and right speaker feeds, the soundfield represented by audio signal representation. The headphones may include a left headphone speaker and a right headphone speaker which are powered (or, in other words, driven) by the corresponding left and right speaker feeds.

The distance from a person 40 to an audio zone may be denoted as $d_{zone\_distance(i)}$. For example, the zone distance for the audio zone 20C is labeled as 62. After the updated movement 17 of the device from the first device position to the second device position, the zone distance to an audio zone may be updated and denoted as $d_{zone\_updated\_distance(i)}$. The ratio of $d_{zone\_distance(i)}$ to $d_{zone\_updated\_distance(i)}$ may affect the control of the audio zone. The zone control ratio (zcr) for the "ith" zone is $$zcr(i) = \frac{d_{zone\_distance(i)}}{d_{zone\_updated\_distance(i)}}.$$

For each audio zone, a ratio (or some other comparison, e.g., a difference of the numerator and denominator of the ratio, or a log difference of the numerator and denominator) of the zone distance to updated zone distance may be used to control the zone. The zcr(i) may be calculated in the zone control unit 420, or in an alternative embodiment, may be calculated in the zone effects unit 432.

Different embodiments for zone effects unit 432 are illustrated in FIG. 5A, FIG. 5B, and FIG. 5C. The audio effects unit 432, may allow for the independent control of the first audio zone and the second audio zone, i.e., the audio data within the first audio zone and the audio data within the second audio zone may be controlled independently of each other.

The audio zone effects unit 432 may be integrated to the one or more processors 402, and may include an adjustment unit 515 configured to adjust the audio data within the first audio zone by a first audio zone factor 525. The adjustment unit 515 adjust the audio data within the first audio zone by one or more first audio zone factor(s) 525 based on the movement of the device (102, 140) change from the first position to the second position. Moreover, the audio effects unit 515 is configured to adjust the audio data within the second audio zone by a second audio zone factor 525 based on the movement of the device (102, 140) change from the first position to the second position.

In one embodiment (see FIG. 5-a), the audio zone effects unit 432A may include an independent loudness compensation unit 515A, which serves as the adjustment unit 515, and may be configured to perform loudness compensation for a zone (first audio zone and/or second audio zone) based on one or more audio zone factor(s) 525A which serve as the audio zone factor(s) 525, as the device (102, 140) moves from a first position to a second position.

An example of controlling the audio zone is loudness adjustment. A scaling factor (audio zone intensity factor 525A) may be multiplied to zcr(i) to increase the strength of the effect (e.g., the strength of the loudness). The audio zone intensity factor 525A may control the effect strength, which may be input by the person 40 to control the intensity or magnitude of the effect strength. The audio zone intensity factor 525A may be controlled by a person 40 (e.g. via a user interface with a button that changes based on touch or voice), or may also be specified by the content creator either dynamically or statically.

The independent loudness adjustment unit 515A may include application of a loudness factor that may be agnostic to the updated movement 17. For example, in an embodiment when the audio format is a channel format, the independent loudness adjustment unit 515A may include an all-pass filter which passes all audio frequencies and does not affect the amplitude of the audio. In the same or alternative embodiment, the loudness adjustment unit 515A may be in a pass-through mode, where the input into the independent loudness adjustment unit 515A is the same as the output of the independent loudness adjustment unit 515A.

In an embodiment, when the audio format is an object format, the metadata associated with the audio object may include the location of the audio source. In some implementations, the location of the audio source may be the location of the dog 7A barking, the woman 7B speaking, or the men 7C, 7D speaking. The location of these audio sources may be used to calculate the distance to an audio zone may be used to update $d_{zone\_updated\_distance(i)}$.

The updated first distance may be designated as $d_{zone\_updated\_distance(1)}$, and the updated second distance may be designated as $d_{zone\_updated\_distance(2)}$. Similarly to when the audio format is a channel format, the independent loudness adjustment unit 515 may include an all-pass filter which passes all audio frequencies and does not affect the amplitude of the audio. In the same or alternative embodiment, the loudness adjustment unit 515 may be in a pass-through mode, where the input into the independent loudness adjustment unit 515 is the same as the output of the independent loudness adjustment unit 515.

In an embodiment, when the audio format is a scene-based format, the mapping points may be mapped to anchor points. Anchor points represent spatial points on a sphere with a center located at the head of the person 40. Anchor points may be used in an ambisonics domain, such as a higher order ambisonics (HOA) or mixed order ambisonics (MOA) domain. MOA may be a subset of HOA. For an audio zone, (as explained below) the variable 'K' is used instead of M to distinguish between using all the points available on a sphere, vs. selectively using the anchor points within a zone, or that may intersect a zone. The variable 'K' is greater than or equal to $(N+1)^2$, where N denotes the greatest order associated with the HOA audio data. The K anchor points result in K spatial directions extending from the head of the person 40 to each of the K spatial points, and may be uniformly spaced or non-uniformly spaced. The K spatial directions may be represented by a subscript "k"$_k$.

The HOA coefficients or MOA coefficients may be associated with the K spatial directions as follows:

$$\tilde{F} = (\Psi^{\hat{}}((O,K)\hat{}T))^{\dagger}(\Psi\_k\hat{}((O,K)\hat{}T))$$

with $\Psi^{(O,K)^T} := [S_1{}^O S_2{}^O \ldots S_K{}^O] \in \mathbb{R}^{O \times K}$ The "†" symbol may denote the pseudo-inverse matrix operation.

The $\Psi^{(O,K)^T}$ symbol may denote a matrix comprised of K directional vectors S of HOA order O. The symbol $\Psi_k^{(O,K)^T}$ may denote a matrix comprised of the modified (translated and rotated) directional vectors as defined in $\Psi^{(O,K)^T}$.

In contrast to prior techniques, when the audio format is a scene-based audio format, all of the anchor points in all M spatial directions around a sphere do not necessarily need to be taken into account in a distance-independent loudness adjustment. For example, the number of spatial directions may be limited to the number of spatial directions that intersect an audio zone. For example, there may be up to K spatial directions extending from the head of the person 40 to K equidistant spatial points that intersect the audio zone. The larger the dimensions of the audio zone, there may be more spatial points that intersect the audio zone. The dimension of an audio zone may be based on proximity of the person 40 to the audio zone. The dimension of an audio zone may also be based on the number of audio objects or audio sources in the audio zone. As an example, each audio zone may have an anchor point density associated with it. In FIG. 2a, the audio zone 20B with the woman 7B has a smaller number of interest points within the audio zone, than the audio zone 20C with the man 7C. Thus, the audio zone labeled 20C has a larger anchor point intra-zone-density than the audio zone labeled 20B, which has a lower anchor point intra-zone density. It should be noted, however, that there may be interest points outside of the audio zone which affect the control of the audio zone, as they also intersect the audio zone. The interest points illustrated by "x", may, in this embodiment, be anchor points, or may be generated based on the intersection of anchor points to the audio zone.

The total number of anchor points associated with a distance-independent loudness adjustment per zone, Azone (l), include the anchor points that (a) intersect an audio zone located within the audio zone), and (b) also include the anchor points that span over some number of angles for some sub-section of the sphere around the person's 40 head that are not located within the audio zone. The total number of anchor points, K, per audio zone included in the distance-independent loudness adjustment per zone Azone(l) determination is as shown below:

$$Azone(l) = \sqrt{\frac{(RS_{k_l}^O)^T (RS_{k_l}^O)}{(R\tilde{F}S_l^U)^T (R\tilde{F}S_l^U)}}, \text{ where } k = 1 \ldots K$$

The audio zone effects unit 432 may use the matrices R (a rendering matrix), F̃ (a version of a preliminary effects matrix), the distance-independent loudness adjustment per zone Azone(l), and the zone control ratio to compensate for the updated movement 17. For example, the following equation may be used to compensate for the updated movement 17: Azone(l)*zcr(l).

To account for controlling different audio zones when the audio format is a scene-based audio format, the effect matrix may be applied before an HOA composition and rendering. That is to say, the composition unit 450 receives the output of the audio zone effects unit 432, which may include the distance independent loudness adjustment. The composition unit 450 may combine the audio data in a scene-based format from different layers. For example, there may be a foreground and background layer that may each include at least one audio zone, and the composition unit 450 may combine these audio zones. The combination, maybe for example based on adding the ambisonics data within each of the zones in the background layer and foreground layer.

In a second embodiment (see FIG. 5-b), the audio zone effects unit 432B may include an orientation/translation adjustment unit 515AB which serves as the adjustment unit 515, and may be configured to perform orientation and/or translation adjustment for a zone (first audio zone and/or second audio zone) based on one or more audio orientation zone factor(s) and/or translation factor(s) 525B which serve as the audio zone factor(s) 525, as the device (102, 140) moves from a first position to a second position. An example of controlling the audio zone is orientation adjustment is the audio zone 20A that includes the dog 7A may be rotated, i.e., the audio data that represents the dog barking may be rotated in a direction towards or away from the person 40. Another example of controlling the audio zone is translation adjustment is the audio zone 20A that includes the dog 7A may be translated, i.e., the audio data that represents the dog barking may be translated in a direction that is up, down, forwards, backwards, or to either side of the user.

In a third embodiment (see FIG. 5-c), the audio zone effects unit 432C may include dynamic range compression unit 515C, which serves as the adjustment unit 515, and may be configured to perform dynamic range compression (drc) for a zone (first audio zone and/or second audio zone) based on one or more audio zone dynamic range factor(s) 525C which serve as the audio zone factor(s) 525, as the device (102, 140) moves from a first position to a second position. Dynamic range compression for a zone may limit the sound within an audio zone and may be desirable to increase the overall gain of a soundfield when rendered.

As discussed previously, in an embodiment, the first audio zone and the second audio zone may be located in a layered soundfield, where the first audio zone is in a first layer of the soundfield, and the first layer of the soundfield is a foreground soundfield. The second audio zone may be in a second layer of the soundfield and is a background soundfield. In an embodiment, the audio data within the second audio zone is configured to be adjusted based on an ambient reference distance, and the audio data within the first audio zone is configured to be adjusted based on a foreground reference distance.

In the same or alternative embodiment, the first audio zone is configured to transition from the first layer of the layered soundfield to the second layer of the layered soundfield. In the same or alternative embodiment, the first audio zone is configured to transition from the first layer of the layered soundfield to the second layer of the layered soundfield, and the audio data within the first audio zone is configured to be adjusted with an adjustment unit based on ambient reference distance, and the audio data within the second audio zone is configured to be adjusted with an adjustment unit based on the ambient reference distance.

In the same or alternative embodiment, the first audio zone is configured to transition from the first layer of the layered soundfield to the second layer of the layered soundfield. In the same or alternative embodiment, the first audio zone is configured to transition from the first layer of the layered soundfield to the second layer of the layered soundfield, and the audio data within the first audio zone is configured to be adjusted with an adjustment unit based on foreground reference distance, and the audio data within the second audio zone is configured to be adjusted with an adjustment unit based on the foreground reference distance.

Figure 6:
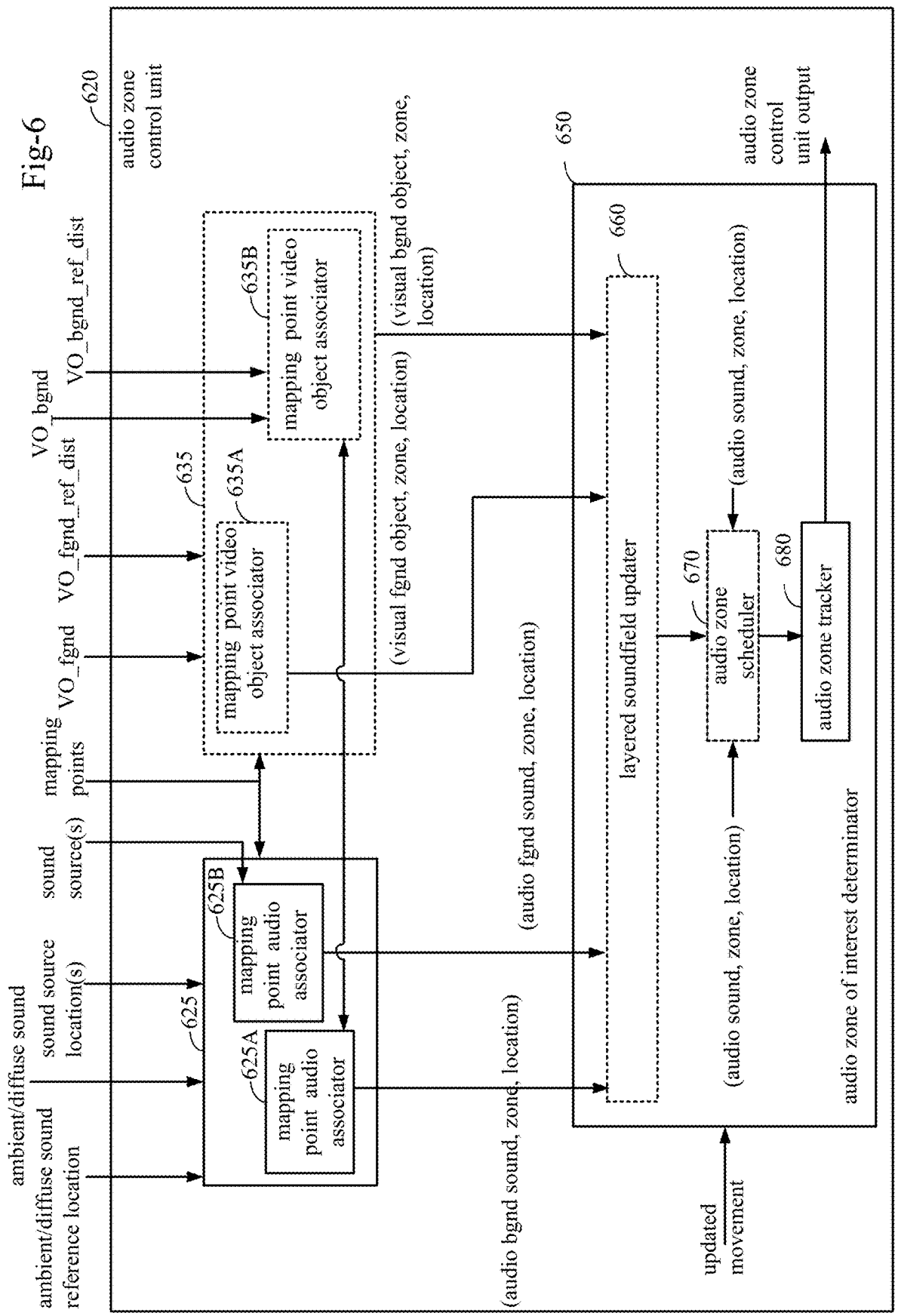
FIG. 6 is a block diagram illustrating one embodiment of the zone control unit that may be used to perform the various aspects of this disclosure.

FIG. 6 is a block diagram illustrating one embodiment of the audio zone control unit 620. The audio zone control unit 620 may include a mapping point associator unit 625 that may associate audio sources or video objects with mapping points. The mapping point associator block unit 625 includes a first mapping point associator unit 625A that may associate mapping points to an ambient sound reference location. The ambient sound reference location includes the location or distance of an ambient sound reference. There may be a number of mapping points that are associated with the ambient sound reference and sound reference location. For ambient sounds, which may be diffuse in nature, the mapping points may be more spread out. As mapping points may represent samples of a soundfield near the ambient source and/or the ambient sound reference location, the output of the mapping point associator unit 625A may take a subset of the mapping points and generate audio interest points. In an embodiment, where there are few mapping points, a full set of mapping points around the ambient source and/or ambient sound reference location may generate interest points. Depending on the diffusivity and strength of the ambient sound, there may be varying densities of mapping points to interest points, where there are less interest points than mapping points. In some instances, there may be an ambient sound and/or ambient location where the mapping points are the audio interest points. The collection of audio interest points generated by the association of mapping points with the ambient source and/or ambient sound reference location may form an audio zone. The output of a mapping point associator unit 625A may be audio interest points, an audio background sound (which may be the ambient source, or part o the ambient source that's within the audio zone, if the ambient source is not entirely within the audio zone) which in this example would be considered audio data, the audio zone (which may include height, width and depth, along with the audio data), and the location of the audio zone relative to the person 40 or some other fixed point in space. The location of the audio zone may be determined in a number of ways, and the point or points within the audio zone that may be used to determine the location may be selected in a number of ways (e.g., one of the corners of the audio zone, the center of the audio zone, the center of mass of the soundfield, a weighted combination of the intensity of the sound and diffusivity).

In the same or alternative embodiment, the mapping point associator block unit 625 includes a second mapping point associator unit 625AB that may associate mapping points to an audio source location. There may be a number of mapping points that are associated with the audio source location. As mapping points may represent samples of a soundfield near the audio source and/or the audio source location, the output of the mapping point associator unit 625B may take a subset of the mapping points and generate audio interest points. In an embodiment, where there are few mapping points, a full set of mapping points around the audio source and/or the audio source location may generate interest points. Depending on the intensity of the audio source, there may be more or less interest points than mapping points. In some instances there may be an audio source and/or audio source location where the mapping points are the audio interest points. The collection of audio interest points generated by the association of mapping points with the audio source and/or audio location may form an audio zone. The output of a mapping point associator unit 625B may be audio interest points, an audio foreground sound (which may be the sound source, or part of the sound source that's within the audio zone, if the sound source is not entirely within the audio zone) which in this example would be considered audio data, the audio zone (which may include height, width and depth, along with the audio data), and the location of the audio zone relative to the person 40 or some other fixed point in space. The location of the audio zone may be determined in a number of ways, and the point or points within the audio zone that may be used to determine the location may be selected in a number of ways (e.g., one of the corners of the audio zone, the center of the audio zone, the center of mass of the soundfield, a weighted combination of the intensity of the sound).

In the same or alternative embodiment, the audio zone control unit 620 may include a first mapping point video object associator 635A. The mapping point video object associator 635A may associate the mapping points to a video object foreground and a video object foreground distance. The mapping points may be pixels. Though pixels may be uniformly spaced within a video object, the mapping to the pixels may be may be uniformly spaced or non-uniformly spaced. The mapping points within an audio zone that are mapped to a video object may not necessarily be the mapping to a predominant sound (i.e., a foreground sound), or an ambient sound (i.e., a background sound). The mapping points within the audio zone may also be mapped to the video object foreground distance. A foreground distance of a video object may include using the center of mass of a video object, a centroid, or some fixed point of the video object. In an embodiment, there may be a connection between the mapping point video object associator 635A and a mapping point audio associator 625B. The connection may include a bus, or signaling mechanism by which to coordinate, or synchronize the association of the video object with appropriate audio source.

In the same or alternative embodiment, the audio zone control unit 620 may include a second mapping point video object associator 635B. The mapping point video object associator 635B may associate the mapping points to a video object background and a video object background distance. The mapping points may also be pixels. Though pixels may be uniformly spaced within a video object, the mapping to the pixels may be uniformly spaced or non-uniformly spaced. The mapping points within an audio zone that are mapped to a video object may not necessarily be the mapping to a predominant sound or an ambient sound. The mapping points within the audio zone may also be mapped to the video object background distance. A background distance of a video object may include using the center of mass of a video object, a centroid, or some fixed point of the video object.

In one embodiment the association of the video object (if present) with audio data in the corresponding audio zone may take place. For example, if the audio data within the first zone is associated with the foreground video object, and if the video object is a foreground video object, the audio data may be also associated with either a diffuse sound or a predominant sound. Depending on the relative distance, among other factors, of the sound (of the dog 7A or the man 7D not speaking with the woman 7B) to the person 40 of the device 400, the audio data may be determined to be a diffuse sound (or ambient sound), or a predominant sound.

In the same or alternative embodiment, there may be a connection between the mapping point video object associator 635B and the first mapping point audio associator 625A, or the other mapping point video object associator 635A (if present) and the second mapping point audio associator 625B. The connection may include a bus, or signaling mechanism by which to coordinate, or synchronize the association of the appropriate video object with appropriate audio source.

Figure 7A:
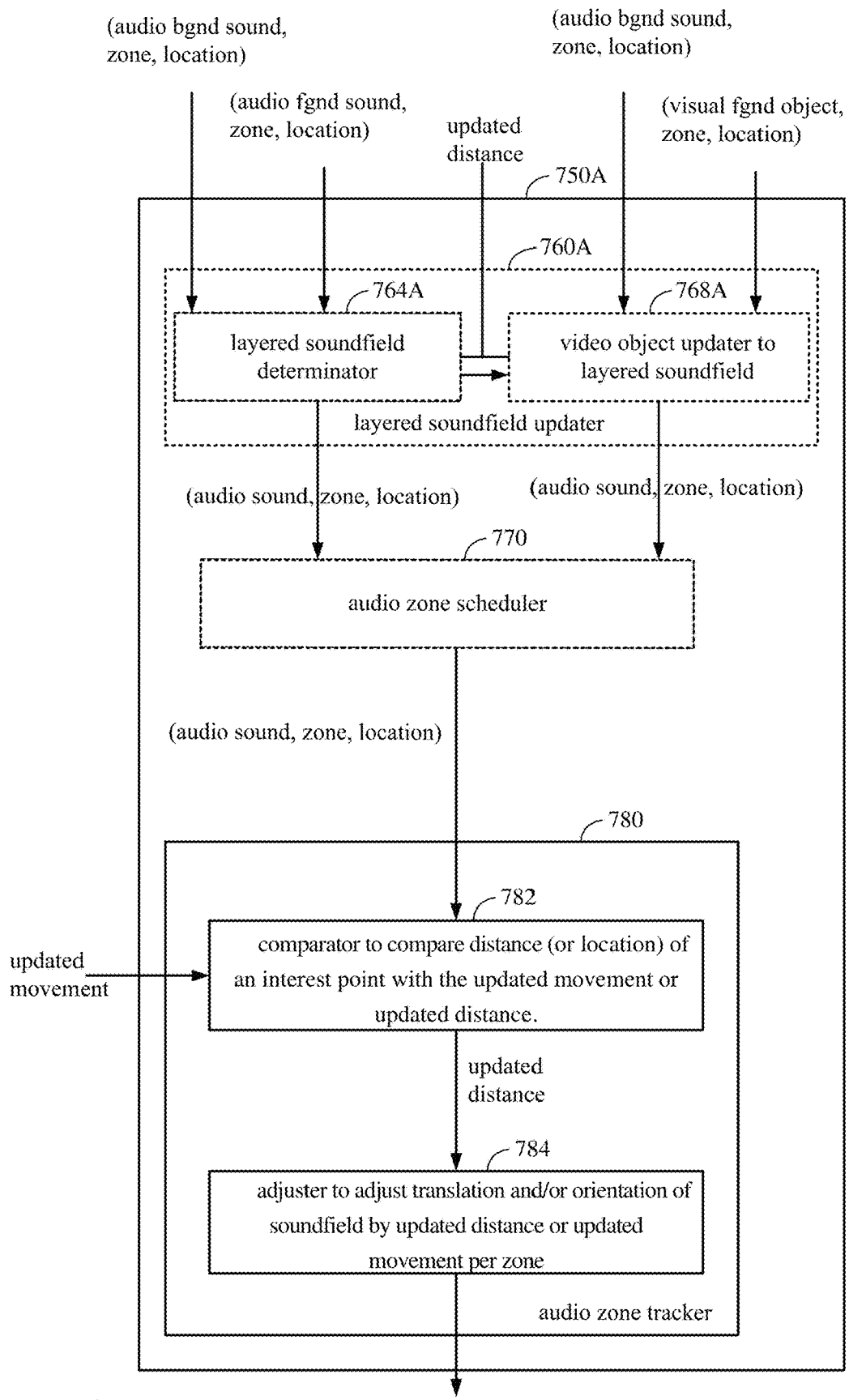
FIG. 7a is a block diagram illustrating a second embodiment the zone control unit that may be used to perform the various aspects of this disclosure.
Figure 7B:
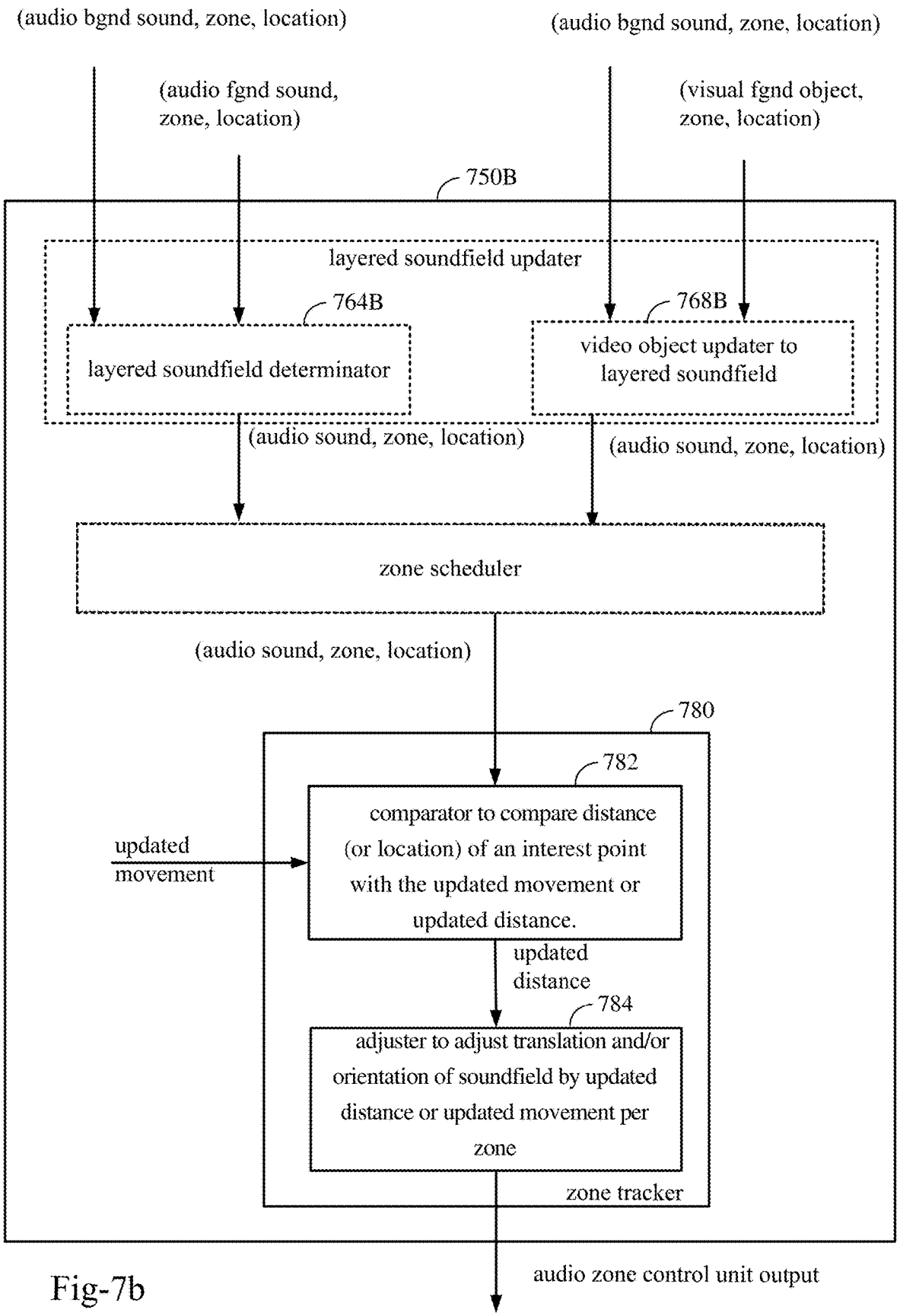
FIG. 7b is a block diagram illustrating a third embodiment of the zone control unit that may be used to perform the various aspects of this disclosure.

The audio zone control unit 620 may include an audio zone of interest determinator 650. For clarity, in some instances in the figures and throughout this disclosure, the term zone may include audio interest points, and also the dimensions of the audio zone. As an example, FIG. 6, FIG. 7a and FIG. 7b illustrate a 'zone' as an input to the audio zone interest determinator. The term zone is used instead of writing 'spatial dimensions of the zone' and separately, 'interest points within the zone'.

In an embodiment, the layered soundfield updater 660 is integrated into the one or more processors 402. The layered soundfield updater 660 is configured to receive an updated movement, and wherein the updated distance includes the third distance or the fourth distance, or both the third distance and the fourth distance. A third distance may be the same as the first distance 62 between an audio zone and the first device position. The third distance, may also be the distance between a video object within the audio zone and the first device position. In an embodiment, the third distance may be some combination of the audio source (predominant or ambient) location and a video object with the audio zone and the first device position.

In the same or alternative embodiment, the layered soundfield updater 660 the fourth distance may be the same as the second distance between an audio zone and the second device position. The fourth distance, may also be the distance between a video object within the audio zone and the second device position. In an embodiment, the fourth distance may be some combination of the audio source (predominant or ambient) location and a video object with the audio zone and the second device position.

The audio zone of interest determinator 650 may also optionally include an audio zone scheduler 670. In an embodiment, the audio zone scheduler 670 may serially pass only one audio zone for the audio zone tracker 680 to track. In a different embodiment, the audio zone scheduler 670 may pass in parallel multiple audio zones for the audio zone tracker 680 to track.

FIG. 7a and FIG. 7b illustrate other embodiments of an audio zone control unit. In FIG. 7a, a block diagram illustrates an embodiment for a layered soundfield updater 760A within an audio zone control unit 750A. The layered soundfield updater 760A may update the layered soundfield determinator 764A based on the updated distance. The output of the layered soundfield determinator 764A may be sent to the video object updater to layered soundfield 768A. The updated distance may allow the layered soundfield determinator 764A to determine when an audio zone transitioned from one layered soundfield to another. For example, an audio zone may have initially been in a background soundfield, and then after the device moving from a first position to a second position, the audio zone changed to be in a foreground soundfield. Similarly, the audio zone may have been initially been in a foreground soundfield, and then after the device moving from a first position to a second position, the audio zone changed to be in a background soundfield.

In FIG. 7a, one embodiment of an audio zone tracker 780 includes a comparator 782 that is configured to compare distance (or location) of an interest point with the updated movement. The comparator 782 may be coupled to an adjuster 784 which is configured to adjust translation and/or orientation of the soundfield by the updated movement or updated distance per audio zone. The audio zone control unit output of the audio zone tracker 780 may include audio data that is based on the updated movement and adjusted to take into account the translation and/or orientation of the soundfield based on the updated movement or updated distance. FIG. 7b is an alternative embodiment to FIG. 7a, except that the layered soundfield updater 760B does not use the updated distance for the audio zone control unit 750B. Thus, in the previous embodiment of the audio zone control unit 750A, the layered soundfield updater 750A output an audio zone which already took into account the updated movement and accordingly the comparator was configured to operate on the audio zone that had already transitioned (if there was a transition) from one layered soundfield to another. In the audio zone control unit 750B, the comparator 782 is configured to operate on an audio zone based on the prior layered soundfield before the potential transition of the audio zone from one layer of the soundfield to another, or within the same layered soundfield but at different locations. The result of the audio zone control unit output for each embodiment, should result in the same perceptible result for the person 40.

Figure 8A:
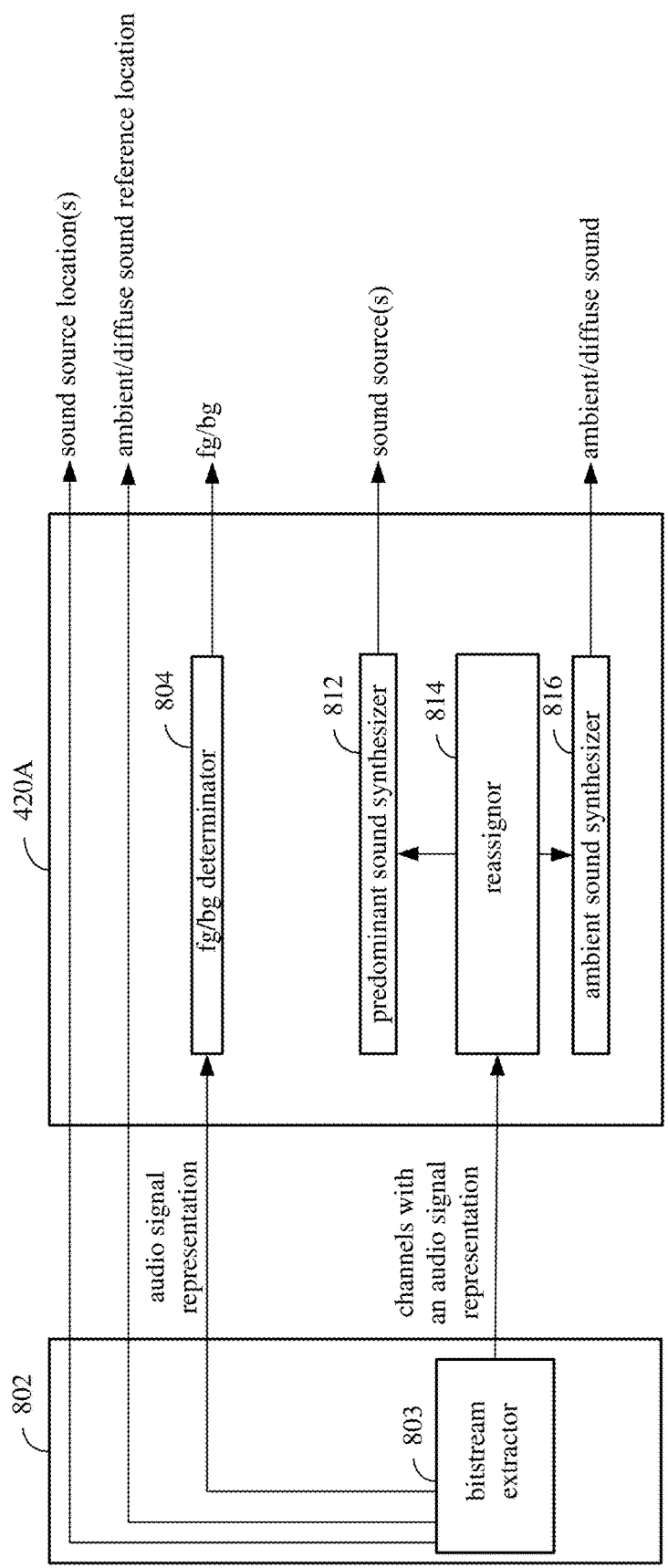
FIG. 8a is a block diagram illustrating part of an audio decoder that may be used with one or more embodiments of the zone control unit.

FIG. 8a is a block diagram illustrating part of an audio decoder that may be used with one or more embodiments of the zone control unit. The audio decoder 802 may include a bitstream extractor 803 that receives audio bitstream data and extracts the audio packets to extract an audio signal representation of a reconstructed soundfield or parts of a reconstructed soundfield. The bitstream extractor 803 may also parse metadata that may include the location of a sound source location or location(s) of multiple sound sources, or the reference location or location of an ambient sound.

An audio spatialization unit 420A may be coupled the audio decoder 802 or may be integrated as part of the audio decoder 802. The audio spatialization unit 420A may include a foreground/background determinator 804 that may determine when the audio signal representation is either a foreground or background sound. In an alternative embodiment, the foreground/background determinator 804 is not present and the metadata includes an indication of when the audio signal representation is a foreground (fg) or background (bg) sound. In an embodiment, the audio spatialization unit 420A may include a predominant synthesizer 812 which may output one or more sound source(s) that are predominant sounds. In addition, there may be an ambient sound synthesizer 816 which may output an ambient sound. In an embodiment which includes a predominant sound synthesizer 812 and ambient sound synthesizer 816 it may not be necessary to include a fg/bg determinator 804. The audio spatialization unit 420A may include a reassignment unit 814 which is configured to assign or direct whether an audio signal representation is sent to the predominant synthesizer 812 or ambient sound synthesizer 816.

In an embodiment, the audio decoder 802A may represent a unit configured to decode bitstream in accordance with the MPEG-H 3D Audio Coding Standard. When the audio format is scene-based, the bitstream extractor 803 may represent a unit configured to extract decompositions of the HOA coefficients, along with other syntax elements or data required to compose a representation of the soundfield defined by the HOA coefficient.

The bitstream extractor 803 may identify one or more transport channels in the bitstream, each of which may specify either an ambient audio signal (which may refer to one or more ambient HOA coefficients), or a predominant audio signal (which may refer to a multiplication of a U vector by an S vector decomposed from the HOA coefficients through application of a linear invertible transform, such as a singular value decomposition, an eigenvalue decomposition, a KLT, etc.). The bitstream extractor 803 may extract the transport channels and output the transport channels to the inverse gain control and reassignment unit 814. Though in future versions of the MPEG-H 3D Audio Coding Standard or other standards, there may not be an inverse gai control unit (not currently shown in FIG. 8a).

Although not shown in the example of FIG. 8A for ease of illustration purposes, the audio decoder 802 may also include a psychoacoustic audio decoder that performs psychoacoustic audio decoding (e.g., advanced audio coding—AAC) with respect to the transport channels. Moreover, the audio decoder 803 may include further units that perform various other operations not shown in the example of FIG. 8a, such as fading between transport channels, and the like.

The bitstream extractor 803 may further extract side information defining syntax elements and other data for performing gain control and assignment. The bitstream extractor 803 may output the side information reassignor 814, and in some embodiments, to an inverse gain control unit.

The bitstream extraction unit 803 may also extract side information defining syntax elements and other data for performing predominant sound synthesis (including, a vector defining spatial characteristics—such as a width, direction, and/or shape—of a corresponding predominant audio signal defined in the transport channels. Additionally, the bitstream extractor 803 may extract side information defining syntax elements and other data for performing ambient synthesis. The bitstream extractor 803 may output the side information to the predominant sound synthesizer 812, and the side information to the ambient synthesizer 816.

The reassignor 814 may represent a unit configured to perform, based on the side information, reassignment with respect to the transport channels. In some embodiments, there may be an inverse gain control unit or function that aids the reassignor 814 to determine, based on the side information, gain control information and apply the gain control information to each of the transport channels to invert gain control applied at the audio encoder device (not shown or may be part of an audio capture device coupled with an audio spatialization unit 420B on the 'encoder side'. in an effort to reduce dynamic range of the transport channels. The reassignor 814 may next, based on the side information, may determine whether each of the transport channels specifies a predominant audio signal or an ambient audio signal.

The predominant sound synthesizer 812 may represent a unit configured to synthesize, based on the side information, predominant audio components of the soundfield represented by the HOA coefficients. The predominant sound synthesizer 812 may multiply each of the predominant audio signals by a corresponding spatial vector (which may also be referred to as a "vector-based signal") specified in the side information. The predominant sound synthesizer output, to an audio zone control unit 428 the result of the multiplication as predominant sound representation. The predominant sound representation (in an ambisonics domain) may serve as the sound source or sound sources for the audio zone control unit 428.

The ambient synthesizer 816 may represent a unit configured to synthesize, based on the side information, ambient components of the soundfield represented by the HOA coefficients. The ambient synthesizer 816 may output, to an audio zone control unit 428, the result of the synthesis as ambient HOA coefficients, where the audio zone control unit 428 may input the ambient HOA coefficients as the ambient sound.

It should be noted that the composition unit 450 which may combine the predominant sound representation and ambient component of the soundfield follows the audio zone control unit 428. This is in sharp contrast to prior techniques known in the art, which apply a composition unit where predominant sound representations in the ambisonics domain and ambient component in the ambisonics domain are combined prior to an effects unit, only for loudness adjustment, and not taking into account audio zones with the multiple capabilities and attributed described herein.

Figure 8B:
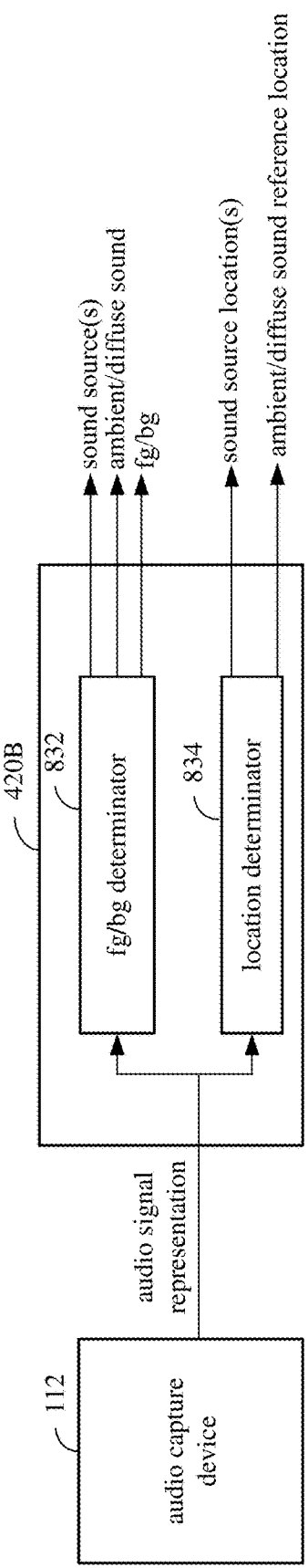
FIG. 8b is a block diagram illustrating part of capturing audio that may be used with one or more embodiments of the zone control unit.

In a different embodiment, there may be an audio capture device 112 (also described in FIG. 4), as shown in FIG. 8b, as part of a block diagram illustrating part of capturing audio that may be used with one or more embodiments of an audio zone control unit. The audio capture device 112 may be coupled to or integrated with a different embodiment of the audio spatialization unit 420B. The audio spatialization unit 420B may include a foreground/background determinator 832 and identify whether an audio signal representation from the audio capture device 112 is a foreground or background sound. In addition, the audio spatialization unit 420B may include a location determinator may find the location of the audio signal representation in the soundfield and output either the sound source location or location(s) if there are multiple sound sources, or the ambient sound reference location or ambient sound location if there are multiple ambient sounds.

In the audio decoder 802A, coupled with an audio spatialization unit 420A, or an audio capture device 112 coupled or integrated with an audio spatialization unit 420B may operate on audio data which is channel-based audio data, object-based audio data, scene-based audio data, a combination of object-based audio data and scene-based audio data, or a combination of channel-based audio data and scene-based audio data, and the audio data is an audio signal representation, and the audio spatialization unit is configured to receive as input the audio signal representation. If the audio data includes scene-based audio data, there may be separate distances for each interest point, and each interest point may be an anchor point. Moreover, if the audio data includes scene-based audio data, the audio data is represented by a combination of a foreground soundfield and a background soundfield with a first set of ambisonic coefficients when the device is at the first device position, and a second set of ambisonic coefficients when the device is at the second device position.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
a memory configured to store a first audio data that represents one or more audio sound sources within a first audio zone, and a second audio data that represents one or more audio sound sources within a second audio zone, and wherein the first audio zone's dimensions include the one or more audio sound sources within a first spatial region of a soundfield, and wherein the second audio zone's dimensions include the one or more audio sound sources within a second spatial region of the soundfield;
one or more processors, coupled to the memory, configured to:
obtain a first distance between the first audio zone and a first device position;
obtain a second distance between the second audio zone and the first device position;
obtain an updated first distance and updated second distance after the device has moved from the first device position to a second device position;
adjust a first audio data that represents one or more audio sound sources within the first audio zone based on the updated first distance;
adjust a second audio data that represents one or more audio sound sources within the second audio zone based on the updated second distance;
independently control of the first audio data that represents one or more audio sound sources within the first audio zone and of the second audio data that represents one or more audio sound sources within the second audio zone, such that the first audio data and the second audio data are controlled independently of each other by applying a first independent adjustment on the first audio data based on the updated first distance and applying a second independent adjustment on the second audio data based on the updated second distance, wherein the first independent adjustment is different than the second independent adjustment; and
generate speaker feeds data to have one or more speakers play out both the first audio data after the first independent adjustment and the second audio data after the second independent adjustment.

2. The device of claim 1, further comprising one or more sensors configured to provide a measurement representative of the movement of the device.

3. The device of claim 1, further comprising a transmitter configured to send one or more of the first device position, the second device position, or the difference between the first device position and the second device position.

4. The device of claim 1, further comprising a camera configured to capture one or more images, wherein regions of interest of the one or more images are associated with the first audio zone and the second audio zone.

5. The device of claim 1, further comprising one or more speakers configured to receive the speaker feeds based on the first independent adjustment on the first audio data based on the updated first distance, and the second independent adjustment on the second audio data based on the updated second distance, and render the speakers feeds.

6. The device of claim 1, wherein the one or more processors include an audio zone effects unit integrated to the one or more processors, the audio zone effects unit, allowing for the independent control of the first audio data and the second audio data, and the audio zone effects unit including an adjustment unit configured to perform the first independent adjustment of the first audio data by a first audio zone factor based on the movement of the device change from the first position to the second position, and wherein the adjustment unit is configured to perform the second independent adjustment of the second audio data by a second audio zone factor based on the movement of the device from the first position to the second position.

7. The device of claim 6, wherein the adjustment unit is an independent loudness compensation adjustment unit and the audio zone factor is an audio intensity factor.

8. The device of claim 1, wherein the first audio zone is in a foreground soundfield, and wherein the second audio zone is in a background soundfield.

9. The device of claim 8, wherein the first audio zone is configured to transition from the foreground soundfield based on a foreground distance from the first audio zone to the first device position, to the background soundfield based on an ambient distance from the first audio zone to the second device position.

10. The device of claim 1, further comprising an audio zone control unit integrated into the one or more processors, wherein the audio zone control unit is configured to receive the updated first distance and the updated second distance.

11. The device of claim 10, wherein the audio zone control unit includes a zone tracker that is configured to track the two or more audio zones and is configured to receive the updated movement, compare the updated movement with a sound location of associated audio interest point, and perform the first independent adjustment, a translation or orientation, of the first audio data.

12. The device of claim 10, wherein the audio zone control unit includes a zone scheduler that is configured to schedule each audio zone to track by an audio zone tracker.

13. The device of claim 1, further comprising an audio spatialization unit coupled to an audio capture device, the audio capture device includes one or more microphones configured to capture audio data and output an audio signal representation of the first audio data and the second audio data, wherein the audio signal representation is input into the audio spatialization unit.

14. The device of claim 1, further comprising an audio spatialization unit integrated into a decoder unit, that is also integrated into the one or more processors, wherein the decoder unit includes a parser unit that is configured to obtain an audio signal representation the first audio data and the second audio data, wherein the audio signal representation is input into the audio spatialization unit.

15. The device of claim 1 wherein the first audio data is associated with a background video object if the first audio data is background sound, and the second audio data is associated with a foreground video object if the second audio data is a predominant sound.

16. A method comprising:
obtaining a first distance between a first audio zone of two or more audio zones wherein the first audio zone's dimensions include one or more audio sound sources within a first spatial region of a soundfield, and a first device position of a device;
obtaining a second distance between a second audio zone of the two or more audio zones and the second audio zone's dimensions include one or more audio sound sources within a second spatial region of the soundfield, and the first device position of the device;
obtaining an updated first distance and updated second distance after movement of the device has changed from the first device position to a second device position;
controlling, independently, a first audio data that represents one or more audio sound sources within the first audio zone and a second audio data that represents one or more audio sound sources within the second audio zone, such that a first independent adjustment is applied on the first audio data based on the updated first distance and a second independent adjustment is applied on the second audio data based on the updated second distance; and
generating speaker feeds to have one or more speakers play out both the first audio data after the first independent adjustment and the second audio data after the second independent adjustment.

17. The method of claim 16, wherein the controlling, independently, the first audio data within the first audio zone by the first independent adjustment includes applying a first audio zone factor and is based on the movement of the device change from the first position to the second position, and wherein adjusting the second audio data within the second audio zone by the second independent adjustment includes applying a second audio zone factor and is based on the movement of the device change from the first position to the second position.

18. The method of claim 17, wherein the first independent adjustment and the second independent adjustment, each, includes at least one of an independent loudness compensation, orientation, translation, or a dynamic range compression, and the first audio zone factor and the second audio zone factor, each, includes at least one of an audio intensity factor, an audio zone orientation factor, an audio zone translation factor, or an audio zone dynamic range compression factor.

19. The method of claim 16, wherein the first audio zone is in a foreground soundfield, and wherein the second audio zone is in a background soundfield.

20. The method of claim 16, wherein the first audio zone transitions from the foreground soundfield based on a foreground distance from the first audio zone to the first device position, to the background soundfield based on an ambient distance from the first audio zone to the second device position.

21. The method of claim 16, wherein the updated movement is based on the updated first distance and the updated second distance.

22. The method of claim 16, is tracking two or more audio zones and is receiving the updated movement, comparing the updated movement with a sound location of associated audio interest point, and performing the first adjustment, a translation or orientation, of the first audio data.

23. The method of claim 16, further comprising capturing, by one or more microphones an audio signal representation of the first audio data and the second audio data.

24. The method of claim 16, further comprising decoding and parsing a bitstream to obtain an audio signal representation of the first audio data and the second audio data.

25. The method of claim 16, wherein the first audio data is a predominant sound associated with a video object when the video object is a foreground video object, and the second audio data is a background sound associated with the video object when the video object is a background video object.

26. The method of claim 16, further comprising wherein the first independent adjustment is different than the second independent adjustment.

27. The device of claim 1, wherein the first independent adjustment is a different type of adjustment than the second independent adjustment.

28. The device of claim 6, wherein the adjustment unit is an orientation adjustment unit, and the audio zone factor is an audio orientation factor.

29. The device of claim 6, wherein the adjustment unit is dynamic range compression adjustment unit, and the audio zone factor is a dynamic range compression factor.

\* \* \* \* \*